(12) United States Patent
Erten et al.

(10) Patent No.: US 6,735,482 B1
(45) Date of Patent: May 11, 2004

(54) INTEGRATED SENSING AND PROCESSING

(75) Inventors: Gamze Erten, Okemos, MI (US); Fathi M. Salam, Okemos, MI (US)

(73) Assignee: Clarity Technologies Inc., Troy, MI (US)

( * ) Notice: Subject to any disclaimer, the term of this patent is extended or adjusted under 35 U.S.C. 154(b) by 0 days.

(21) Appl. No.: 09/914,030

(22) PCT Filed: Mar. 6, 2000

(86) PCT No.: PCT/US00/05785

§ 371 (c)(1), (2), (4) Date: Aug. 22, 2001

(87) PCT Pub. No.: WO00/52639

PCT Pub. Date: Sep. 8, 2000

Related U.S. Application Data

(60) Provisional application No. 60/123,177, filed on Mar. 5, 1999.

(51) Int. Cl.[7] .............................................. G05B 19/18
(52) U.S. Cl. ................................ 700/2; 700/5; 700/44; 700/45; 700/48; 706/22; 706/26; 348/294
(58) Field of Search .............................. 706/22, 26, 31, 706/37, 39, 908, 916, 919, 921; 700/44–46, 48, 39, 50, 2–5; 348/294

(56) References Cited

U.S. PATENT DOCUMENTS

| | | | |
|---|---|---|---|
| 5,140,670 A | * 8/1992 | Chua et al. | .................... 706/29 |
| 5,200,914 A | * 4/1993 | McCanny et al. | .......... 708/317 |
| 5,208,786 A | 5/1993 | Weinstein et al. | |
| 5,329,611 A | * 7/1994 | Pechanek et al. | ............. 706/42 |
| 5,355,528 A | * 10/1994 | Roska et al. | .................. 706/35 |
| 5,383,164 A | 1/1995 | Sejnowski et al. | |
| 5,483,620 A | * 1/1996 | Pechanek et al. | ............. 706/42 |
| 5,539,832 A | 7/1996 | Weinstein et al. | |
| 5,706,402 A | 1/1998 | Bell | |
| 5,923,779 A | * 7/1999 | Ohmi et al. | ................ 382/190 |
| 6,185,309 B1 | 2/2001 | Attias | |
| 6,389,445 B1 | 5/2002 | Tsividis | |

FOREIGN PATENT DOCUMENTS

| | | |
|---|---|---|
| WO | WO 98/58450 | 12/1998 |
| WO | WO 99/66638 | 12/1999 |

OTHER PUBLICATIONS

Erten et al., "Two cellular artitectures for integrated image sensing and processing on a single chip" pp. 637–659, VOl. 8, No. 5–6, Dec. 1998.*

Erten et al., "Modified cellular neural network architecture for integrated image sensing and processing"; pp. 120–123, Jun. 1999, vol. 5.*

T. Nomura et al., "An Extension of The Herault–Jutten Network To Signals Including Delays For Blind Separation," 1996, p. 443–452.

F.M. Salam and G. Erten, "Blind Signal Separation and Recovery in Dynamic Environments," 5 pgs.

G. Erten and F.M. Salam, "Real Time Separation of Audio Signals Using Digital Signal Processors," IEEE, 1997, p. 1237–1240.

A. Chichocki et al., "Adaptive Approach To Blind Source Separation With Cancellation of Additive and Convolutional Noise," Proceedings of ICSP '96, vol. 1, p. 412–415.

(List continued on next page.)

*Primary Examiner*—Ramesh Patel
(74) *Attorney, Agent, or Firm*—Brooks Kushman P.C.

(57) ABSTRACT

An integrated sensor processing cell device capable of transforming, reshaping, and modulating an original sensed image includes a sensing medium. At least one memory device stores weight bits. Multiplexers are associated with at least one of the memory devices. At least one transconductance amplifier is associated with at least one of the multiplexers. A multiple input logic gate, associated with at least one of the memory devices, is configured to store a signed pixel output derived from the sensing medium output.

3 Claims, 25 Drawing Sheets

OTHER PUBLICATIONS

A. Bell and T. Sejnowski, "Blind Separation and Blind Deconvolution: An Information–Theoretic Approach," IEEE, 1995, p. 3415–3418.

C. Marven and G. Ewers, "A Simple Approach to Digital Signal Processing," p. 90–103, 1996, John Wiley & Sons, Inc.

P. Gilbert, "State Space and ARMA Models: An Overview of the Equivalence," Mar. 1993.

E. Weinstein et al., "Multi–Channel Signal Separation by Decorrelation," IEEE Transactions On Speech and Audio Processing, vol. 1, No. 4, Oct. 1993, p. 405–413.

C. Jutten and J. Herault, "Blind Separation Of Sources, Part I: An Adaptive Algorithm Based On Neuromimetic Architecture," Signal Processing, vol. 24, 1991, p. 1–10.

C. Jutten and J. Herault, "Blind Separation Of Sources, Part II: Problems Statement," Signal Processing, vol. 24, 1991, p. 11–20.

F.M. Salam, "An Adaptive Network For Blind Separation Of Independent Signals," IEEE, 1993, p. 431–434.

H. Thi and C. Jutten, "Blind Source Separation For Convolutive Mixtures," Signal Processing European Journal Devoted to the Methods and Applications of Signal Processing, vol. 45, No. 2, Aug. 1, 1995, p. 209–229.

* cited by examiner

4(a) Feedback connected amplifiers

4(b) Differential multiplier which multiples (Gain − Gain_ref) by (Positive−Negative)

One feedback one feedforward cell with initialization

Cells with programmable bias

11(a) cells with feedback feedforward and bias

Cell without feedback

11(b) cell without feedback

Edge 1 input = output = thresholded output

Edge 2 input = output = thresholded output (a) all outputs tied together (b) outputs connected along rows and columns (a)   3 x 3 arrangement          (b) contents of one element

INTEGRATED SENSING AND PROCESSING

This application is the U.S. national phase of PCT application number PCT/US00/05785, filed Mar. 6, 2000, which further claims the benefit of U.S. provisional application Ser. No. 60/123,177, filed. Mar. 5, 1999.

STATEMENT REGARDING FEDERALLY SPONSORED RESEARCH OR DEVELOPMENT

The invention was made with Government support under Contract No. F29601-98-C-0023, N0014-97-C-0014, F29601-98-C-0049, and F29601-97-C-0107 awarded by the United States Air Force. The Government has certain rights to the invention.

FIELD OF THE INVENTION

The present invention relates to an integrated sensing and processing device. More specifically, the present invention relates to an architecture for the integrated realization of sensing and processing within a single device.

BACKGROUND

Currently, Cellular Neural Networks (CNN) build a paradigm based on a set of canonical differential- equations (Equations 1–3 below) that define a set of nonlinear dynamic interactions between cells in a (usually two dimensional) grid. There are several degrees of freedom in setting up these interactions in the form of feedback and feedforward weights (namely the values A and B in Equation 1) and the initial conditions of the states ($x(t=0)$ in Equation 1) and the bias currents (I in Equation 3). CNN is in fact programmed by way of manipulating these values. The nonlinearity comes from the nonlinear nature of the function ('f' in Equation 2). The function "f" can take on different shapes and characteristics. Programming a particular function is then delegated to finding the right combination of A, B, $x(t=0)$, and I that yields the desired outcome or outputs (y) given a pattern of inputs (u). This type of programmability is quite flexible.

CNN is a hybrid of Cellular Automata and Neural Networks (hence the name Cellular Neural Networks) and it incorporates the best features of both concepts. Like Neural Networks, its continuous time feature allows real-time signal processing, and like Cellular Automata its local interconnection feature makes physical realization in VLSI possible. Its grid-like structure is suitable for the solution of a high-order system of first order nonlinear differential equations on-line and in real-time. In summary, CNN can be viewed as an analog nonlinear dynamic processor array. The basic unit of CNN is called a cell. Each cell receives Input from its immediate neighbors land itself via feedback), and also from external sources (e.g. the sensor array points and/or previous layers).

The canonical CNN equation summarizes these relationships:

$$\tau_{ij} \dot{x}_{ij}(t) = -x_{ij}(t) + \sum_{kl \in N_r(ij)} A_{ij,kl}(y_{kl}(t), y_{ij}(t)) + \sum_{kl \in N_r(ij)} B_{ij,kl}(u_{kl}(t), u_{ij}(t)) + I_{ij} \quad \text{Equation 1}$$

and $$y_{ij} = f(x_{ij}) \quad \text{Equation 2}$$

$$I_{ij} = I \quad \text{Equation 3}$$

where u represents the input, x represents the state, and y represents a nonlinear function of the state associated with a cell (or neuron), and A and B represent the cloning templates.

In a typical CNN, local connections between the neighbors (feedback weights, or the entries of the matrix A in Equation 1), along with connections form the sensory array (input weights, or entries of the matrix B in Equation 1) form the programmable cloning templates. Cloning templates to perform numerous types of visual processing tasks have been developed. Each template is specific to a particular application, e.g., a cloning template for edge detection or binocular stereo. Cellular neural networks are attractive in image processing because of their programmability: One needs to change only the template to perform a different iconic task.

Despite such flexibility, critical problems arise when one tries to implement CNN in electronic circuits. The CNN model described in Equations (1–3), however, is not suitable for direct VLSI implementation. In an integrated circuit implementation of the CNN model, the summation equation is a current based computation, as the circuit model in FIG. 1 suggests. By Kirchoff's law, all currents coming into the node that defines the state of the cell (x) must add to zero. As the intrinsic resistance values (R) are very large and capacitance values are very small, little charge is required to maintain a particular voltage. This also means that the current required to alter the voltage value of the state is relatively very small. The values of the noise currents are of sufficient magnitude to make significant difference. When one adds to that the fact that the transistor characteristics can generally vary as much as 20% within the same chip substrate, it becomes clear that the (x) node is highly likely to charge up or down to a power rail. One remedy is adding significant capacitance to each node. This is not desirable at all since it requires precious VLSI real estate and furthermore increases the response time of the cell. The VLSI implementations of the current CNN models have not addressed this issue and as such, the current CNN model described in Equations (1–3) is not suitable for direct VLSI implementation.

SUMMARY

An integrated sensing device comprising an array of sensor processor cells capable of being arranged into a detection array. Each sensor processor cell comprises a sensing medium; at least one transconductance amplifier configured for feedforward template multiplication; at least one transconductance amplifier configured for feedback template weights; a plurality of local dynamic memory cells; a data bus for data transfer; and a local logic unit. The array of sensor processor cells, by responding to data control signals, is capable of transforming, reshaping, and modulating the original sensed image into varied represenations which include (and extend) traditional spatial and temporal processing transformations.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, algorithms, and circuits have not been described in detail so as not to obscure the invention.

In one embodiment the steps or process of the present invention are embodied in machine-executable instructions, such as computer instructions. The instructions can be used to cause a general-purpose or special-purpose processor that is programmed with the instructions to perform the steps of the present invention. Alternatively, the steps of the present invention might be performed by specific hardware components that contain hardwired logic for performing the steps, or by any combination of programmed computer components and custom hardware components.

The present invention is generally directed to a new cellular network architecture that can be implemented successfully using electronic circuits and integrated microelectronic chips, and a new distributed architecture comprising two separate arrays, namely a programmable convolution array PCA and a programmable logic array PLA for processing one, two or three dimensional array (physical) sensor data.

DYNAMIC CELLULAR ARCHITECTURE

One embodiment of the present invention introduces a self-normalizing feedback structure for the computation of the inputs and feedforward template. Similarly, the present invention also introduces the same structure to the feedback portion of the architecture. These modifications create a new set of equations, and correspondingly a new set of dynamics, and thus represent a new structure, form, and architecture; The feedback in the feedforward input weight multiplication process and the feedback in the feedback weight multiplication are employed to keep the state node (x) from quickly accumulating or losing charge to saturate to a power rail.

Figure 1:
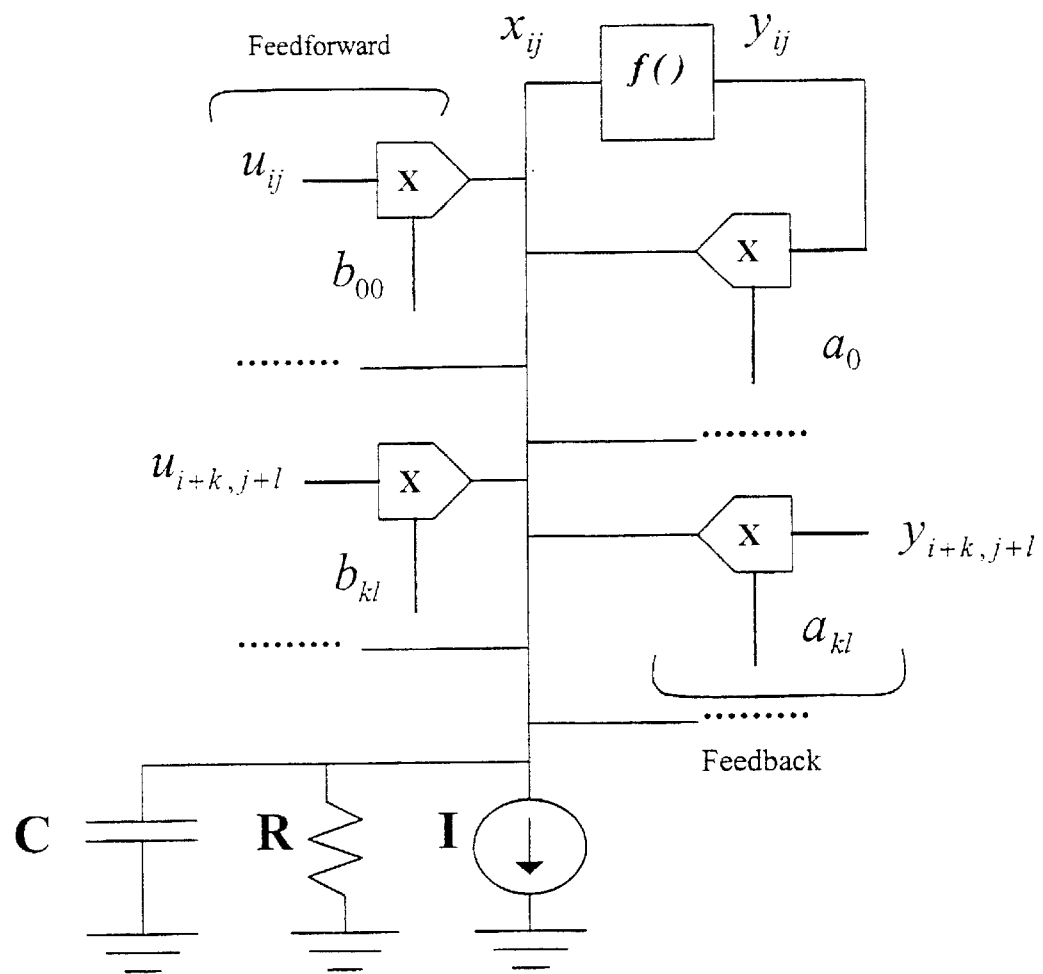
FIG. 1 (Prior Art) illustrates an existing embodiment of an architecture of a physical realization of the cellular neural network canonical equations.
Figure 2:
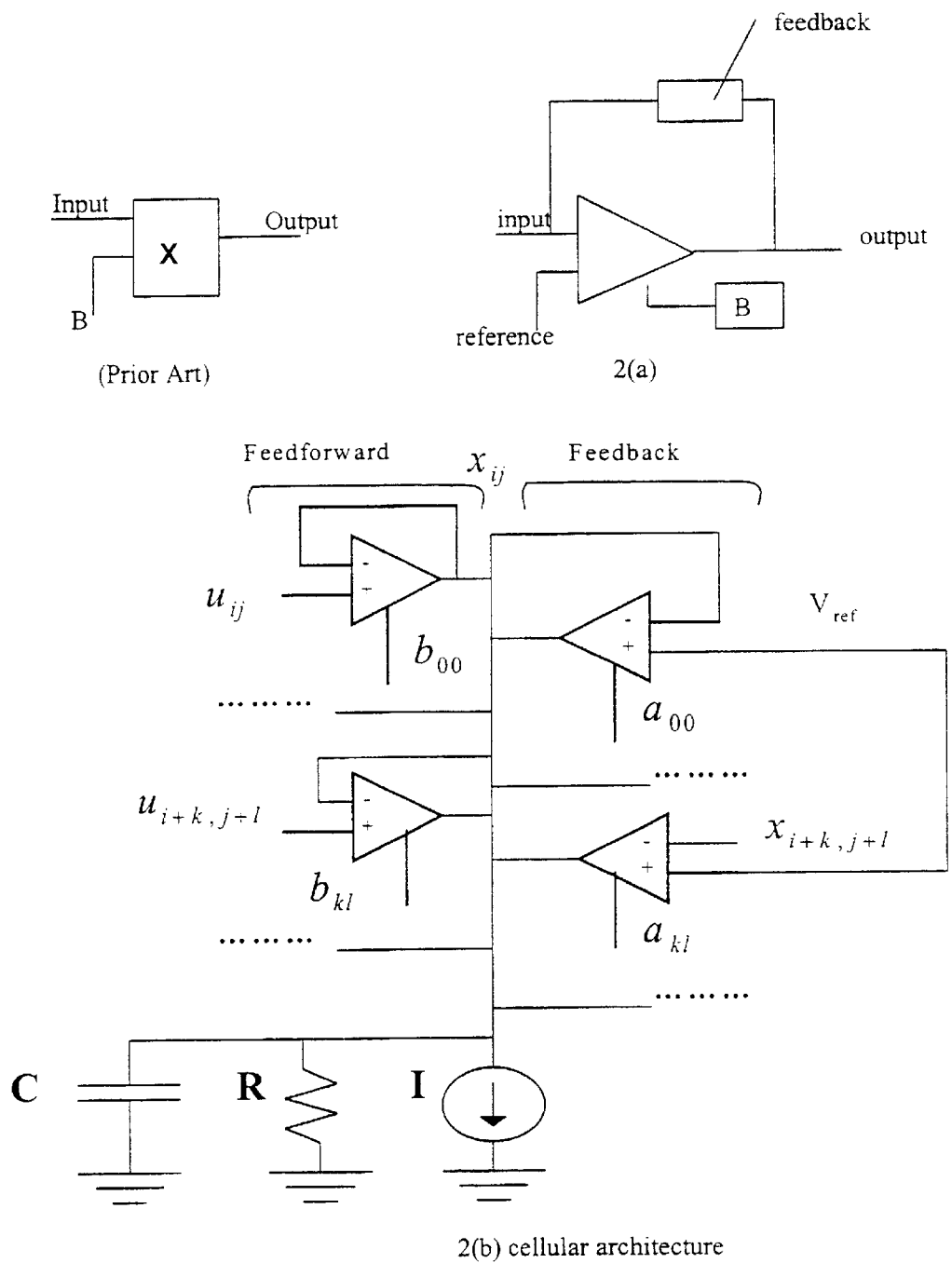
FIGS. 2(a) and 2(b) illustrates an embodiment of an adaptation of a dynamic cellular computation model to the VLSI domain in accordance with the teachings of one embodiment of the present invention.

FIG. 2 illustrates one embodiment of the present invention implemented in circuitry. FIG. 2(a) illustrates one embodiment of a self regulating mechanism, wherein rather than multiplying the input by B (as in the prior art), a function of the input minus the state is defined per node and that quantity is multiplied by that B. As such, the stabilizing and self scaling feedback elements around an amplifier keep the output of the amplifier from saturating. The gain of the amplifier is manipulated to obtain a factor which is a scaled (normalized) version of B. In this way, the output is consistently the input times a normalized vesrion of "B" and the plural (collective) inputs from the cell neighborhood will not cause the cell's aggregate state or output to saturate or be overdriven with slight fluctuations of the input. FIG. 2(b) illustrates one embodiment of an adaptation of the dynamic cellular computation model to the VLSI domain using the concept shown in FIG. 2(a). In one embodiment, it is assumed that all input weights (or, all entries of B weights are nonnegative) and all feedback weights (all entries of A) are nonpositive.

As illustrated in the embodiment of FIG. 2, within the circuit implementation shown in FIG. 2(b): (1) both u (unsigned) and x (signed) are represented as analog voltages u and x; (2) template weights can be digitally stored, and are programmable; and (3) the transfer function f( ), such as that illustrated in Equation 2, can in fact become a programmable tri-level saturation function, f'( ) that produces zero output in a local region of the input (rather than only at a point).

The particular equations that incorporate the characteristics of the circuit structure of FIG. 2 are listed below.

$$C\dot{x}_{ij}(t) = \frac{-x_{ij}(t)}{R} + \sum_{kl \in N_r(ij)} A_{kl} y_{kl}(t) + \sum_{kl \in N_r(ij)} B_{kl} \tanh\left[\frac{q\kappa}{2kT}(u_{kl}(t) - x_{ij}(t))\right] + I_{ij}$$

Equation 4

$$y = f(x) = \tanh\left(\frac{q\kappa}{2kT}(x - V_{REF})\right)$$

Equation 5 and $$I_{ij} = I$$

Equation 6 where the hyperbolic tangent (tanh) describes a basic transconductance circuit. Moreover, the differential equations need to be initialized from the cells initial conditions:

$$x_{ij}(0)$$

We observe that the capacitor C and the resistor R may be due to the parasitics of the micro-electronic implementation process. However, in cases where larger capacitance than the parasitics is desired in order to slow down or reshape the temporal processing, then capacitances in the order of picofarads may be implemented on chip. Any larger capacitance may be implemented off-chip with the likely consequent cost of limiting the size of the cellular array.

In one embodiment, the input (feedforward) weights (B) are implemented in a negative feedback structure. Accordingly, in this implementation, the feedback structure stabilizes the state (x) node, which otherwise has a tendency to charge all the way up or down to a rail limited by the power supply, and the structure is far more resilient to manufacturing related issues such as transistor mismatches. In the embodiment of FIG. 2, the modified dynamic cellular architecture model is shown, wherein some assumptions have been made about the polarity of inputs and weights, such as B is nonnegative and A is nonpositive.

Figure 3:
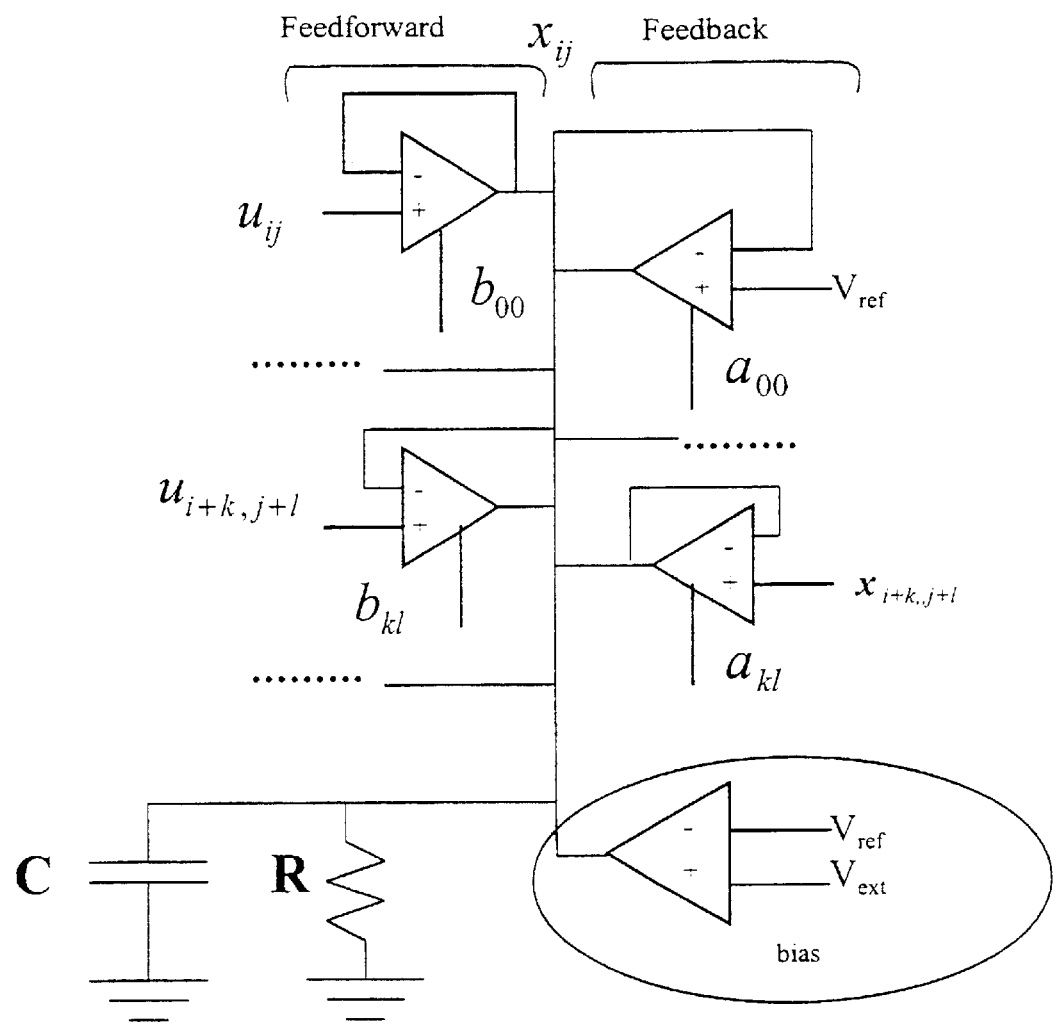
FIG. 3 illustrates an alternate embodiment of an adaptation of a dynamic cellular computation model to the VLSI domain in accordance with the teachings of one embodiment of the present invention.

FIG. 3 illustrates an alternate embodiment, illustrating a revision or modification that enhances the implementation scales and the contributions of the states as well. Accordingly, the particular equations represent the circuit architecture which is implementable in integrated microelectronic chips are:

$$C\dot{x}_{ij}(t) = \frac{-x_{ij}(t)}{R} + A_{ij} y_{ij}(t) + \sum_{kl \in N_r n(ij)} A_{kl} y_{kl}(t) + \sum_{kl \in N_r(ij)} B_{kl} \tanh\left[\frac{q\kappa}{2kT}(u_{kl}(t) - x_{ij}(t))\right] + I_{ij}$$

Equation 7

$$y_{ij} = f(x_{ij}) = \tanh\left(\frac{q\kappa}{2kT}(V_{REF} - x_{ij})\right)$$

Equation 8

$$y_{kl} = f(x_{kl}) = \tanh\left(\frac{q\kappa}{2kT}(x_{kl} - x_{ij})\right)$$

and $I_{ij} = \tanh\left(\frac{qk}{2kT}(V_{ext} - V_{ref})\right)$

Equation 9 where the hyperbolic tangent (tanh) represents a basic (or wide-range) transconductance amplifier circuit.

In one embodiment, the indices kl runs over a neighborhood of the cell location ij for the feedback term A, while kl run over a neighborhood of the location ij in the feedforward term associated with the B parameters. As before, the input (feedforward) weights (B) are implemented in a negative state-feedback structure. Accordingly, in this implementation, the feedback structure stabilizes the state (x) node, which otherwise has a tendency to charge all the way up or down to a rail limited by the power supply, and the present structure is far more resilient to manufacturing related issues such as transistor mismatches. As such, FIG. 3 illustrates this modified dynamic cellular architecture model is shown, wherein some assumptions have been made about the polarity of inputs and weights, such as each elements of B and A is nonnegative.

Figure 4:
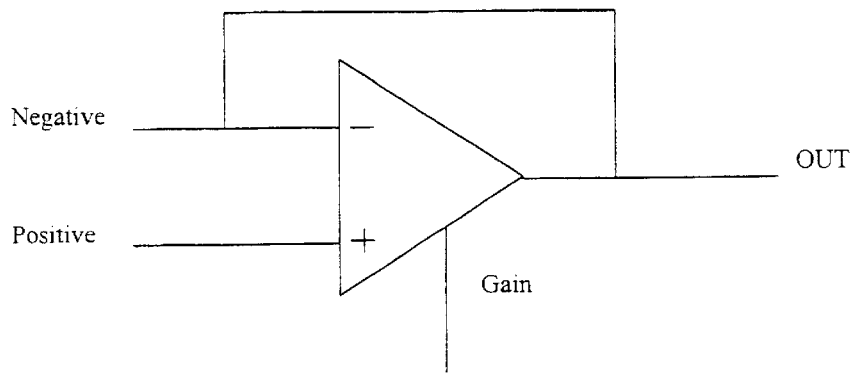
FIGS. 4(a) and 4(b) illustrates an alternate embodiment of an adaptation of a dynamic cellular computation model to the VLSI domain employing analog multipliers in accordance with the teachings of one embodiment of the present invention.
Figure 4:
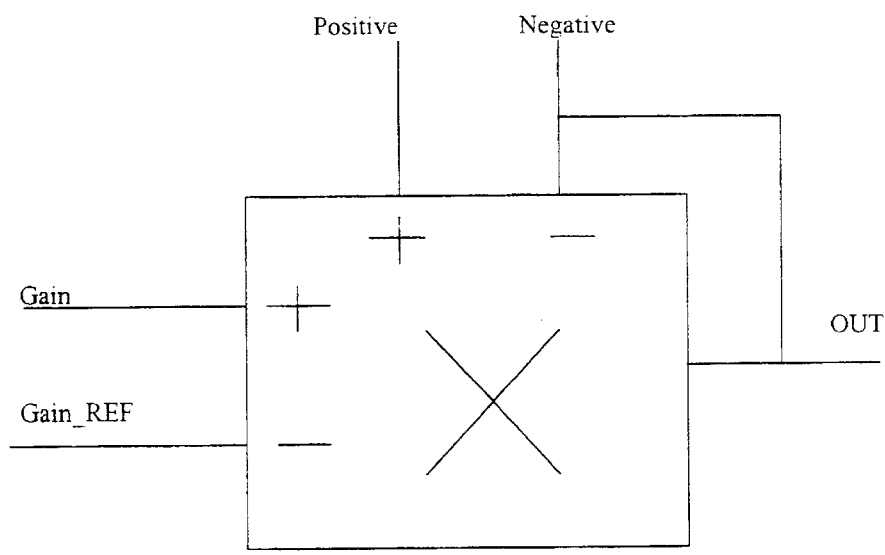

FIG. 4 illustrates yet another embodiment that employs the usage of analog multipliers (rather than amplifiers with gain). As such, the feedback connected amplifiers of the embodiment of FIG. 3 (Illustrated as FIG. 4(a)) may be replaced by analog multipliers to implement weights of positive or negative sign, as illustrated in FIG. 4(b). Moreover, digital gains can also be built by way of modifying the analog multipliers gain with the digital input accommodation via parallel transistor cascading method shown in FIG. 9. By adding a multiplier that is capable of sign representation, the restrcitions on template weights are eliminated.

Dynamic Cellular Architecture Process

Figure 5:
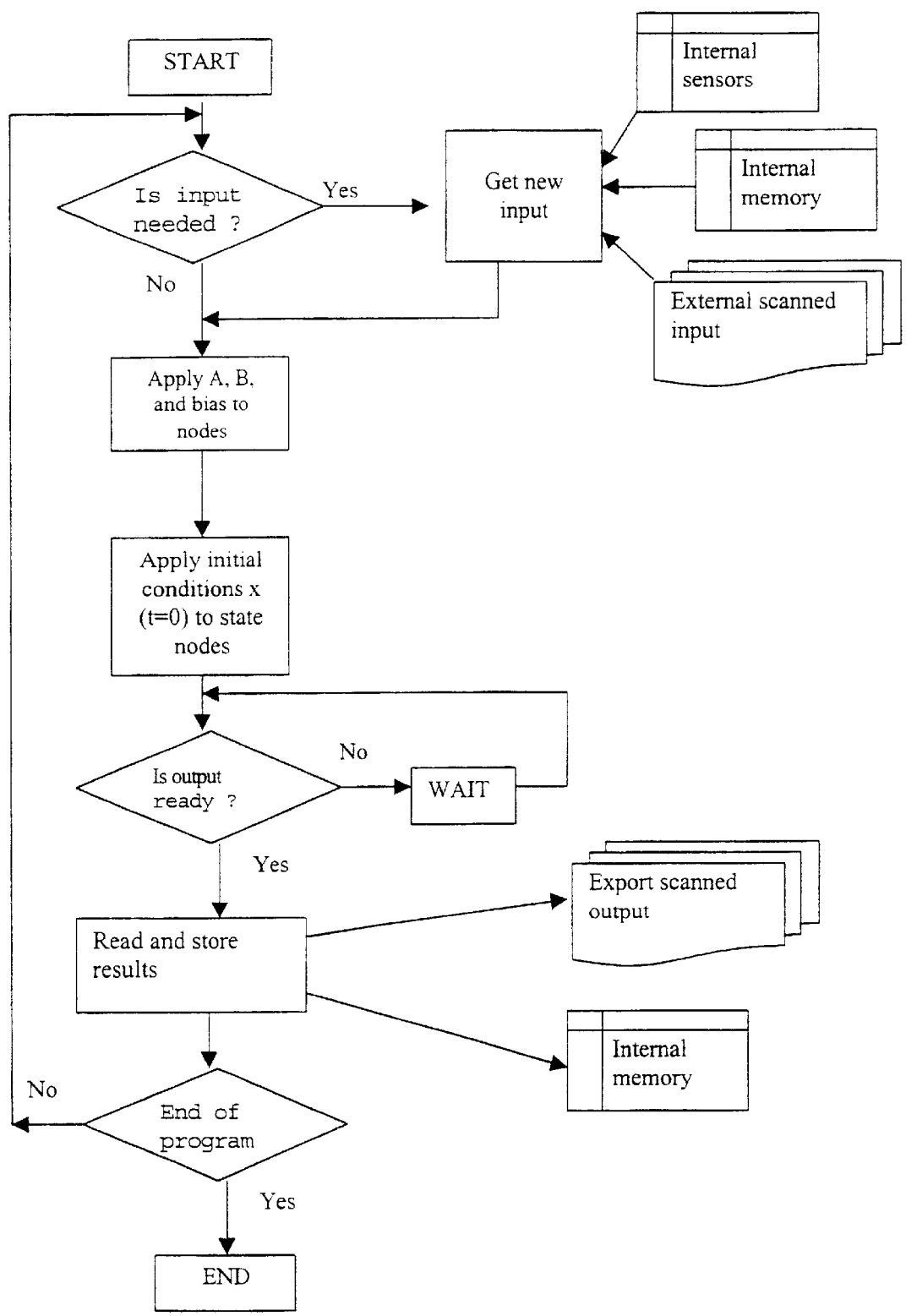
FIG. 5 illustrates an embodiment of an operational process in flow chart format for a dynamic cellular architecture in accordance with the teachings of one embodiment of the present invention.

FIG. 5 illustrates one embodiment of the operational process of the Dynamic Cellular Architecture illustrated above. In one embodiment, before the process begins, the necessary A, B, x(0), and bias values for all of the operations to be performed is determined. Accordingly, in one embodiment, a program is made of operations needed to complete the task, such that each step of the program specifies an operation, where each operation is defined by the pattern of A, B, x(0) and bias values to be applied to the cellular architecture. In one embodiment, it is possible to simply obtain these values from the results of previous operations. In one embodiment, the program may be stored externally or on the same chip where the architecture is implemented. In an alternate embodiment, each cell of the architecture may contain its own program memory.

Referring back to FIG. 5, one embodiment of the operational process of the Dynamic Cellular Architecture illustrated above, may be implemented through the following process:

1. START
2. If previous operation is complete or if new data is needed, get new inputs. These inputs (values of the nodes labeled u) may come from continuous or discretely sampled data from sensors built into the architecture, or alternately, they can be scanned into the input nodes (u) from an external data source by employing an appropriate scanning mechanism.
3. Apply the A, B, and bias to the correct nodes, either externally or from internal stored program memory.
4. Apply the initial states (x(t=0)) to the state nodes.
5. Allow sufficient time for the computation to complete, i.e., for the electronic circuits to reach a point where the change of the values of the states equals zero or have sufficiently responded to the input stimulus. For active sensors, which do not produce a static output, there may be a specific optimum or desired time instant to sample their output. Another option is that the output itself is a time variant waveform.
6. Read and store the states (x) or the output nodes (y). The state or output can be stored externally or internally per node.
7. If end of program, go to (END).
8. Go to (2).
9. END As such, the aforementioned process steps illustrate one embodiment of the operational process of the Dynamic Cellular Architecture.

Dynamic Cellular Architecture-Sample Implementation

Figure 6:
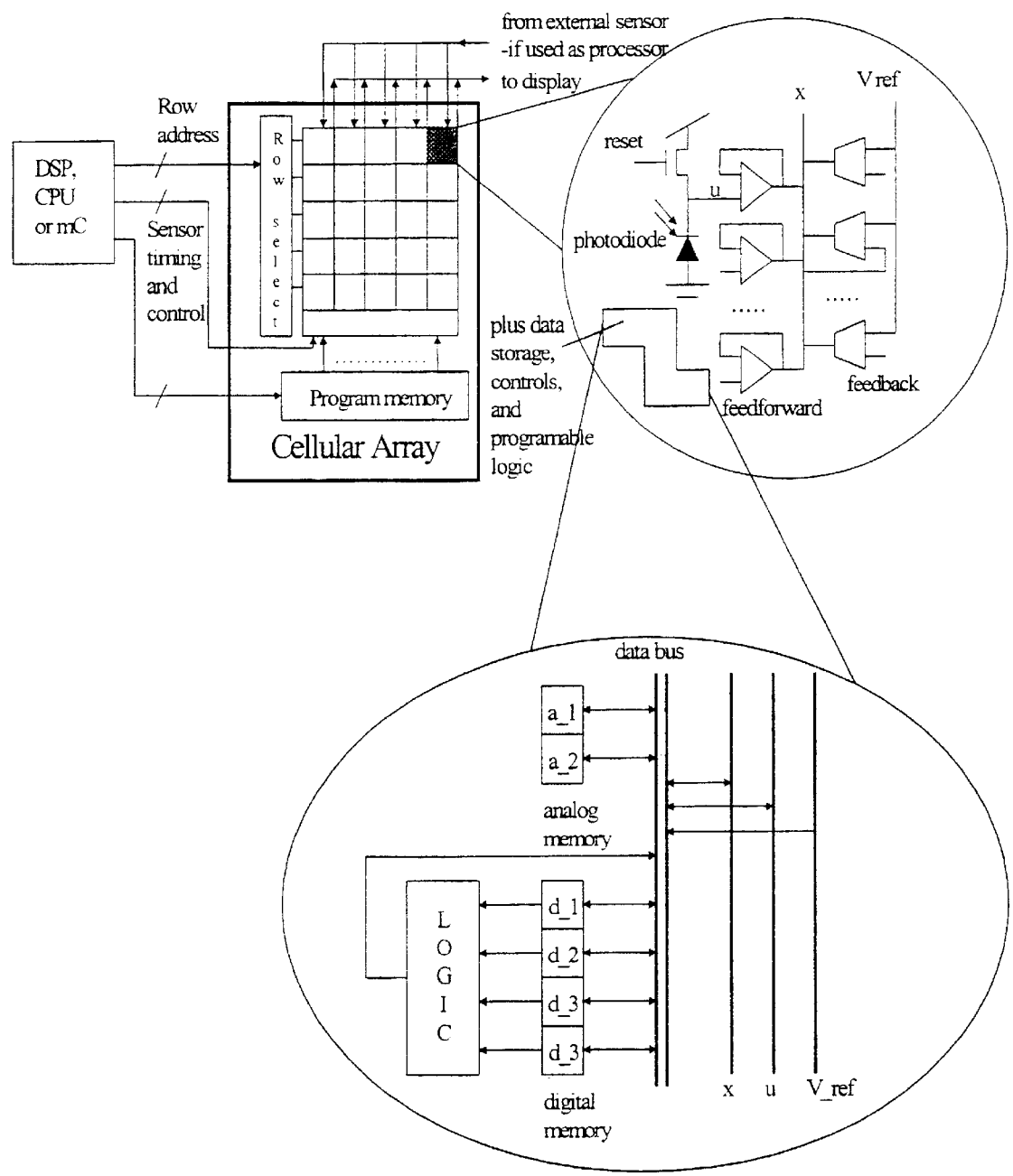
FIG. 6 illustrates an embodiment of a cellular architecture element or cell in accordance with the teachings of one embodiment of the present invention.

FIG. 6 illustrates one embodiment of a pragmatic implementation of the Dynamic Cellular Architecture, as a simple 5×5 array. FIG. 6 illustrates an integrated light sensing and processing architecture implemented within cellular chip based on the dynamic cellular architecture of this invention. It is understood that the inventive concepts of the present invention may be applied to a variety of different technologies and implemented in a variety of different physical architectures, and as such, the present invention is not meant to be limited to integrated light sensing and processing architectures. In one embodiment, the integrated light sensing and processing architecture based on the dynamic cellular architecture of this invention is comprised of an array of identical sensor processor cells, each of which contain: (1) a photodiode and circuits for active light sensing; (2) transconductance amplifiers for feedforward template weight multiplication; (3) wide range transconductance amplifiers for feedback template weights; (4) analog/ single bit digital local dynamic memory cells; (5) a data bus for transfers; (6) local programmable logic; and (7) read/write data controls.

In the embodiment of the structure illustrated by FIG. 6, a variety of operations of the cellular paradigm may be performed using, for instance, a pair of 3×3 cloning templates, defined by the A and B of Equations (4) or (7). Generally, each operation can be completed in a short time while it:is carried out in each of the elements over the entire image. This implies unprecedented processing rate improvements of sequential processors. In one embodiment, the operations include linear transformations of the input (convolution operations), plus connected component detection and other types of data manipulation allowed for by the feedback weights. For instance, some example operations are edge location, morphology operators such as dilation, thinning, and erosion, light adaptation, scratch removal, texture, color and shape analysis. In addition, in one embodiment, by using the initialization of the states by previously obtained frames, it is also possible to use the two template array to implement temporal operations, such as motion analysis, e.g., local velocity detection, motion direction detection.

In the embodiment of FIG. 6, the overall cellular chip is illustrated as a system. In this embodiment, an external (or international core) microcontroller generates the necessary command signals to the integrated sensor processor, such as sensor timing, row select, and program code. In an alternate embodiment, the microcontroller can be replaced by a processor or a digital signal processor depending on the computing needs of the particular application at hand. Likewise, in one embodiment, the program memory can be internal, where a more compact address gets horizontally coded into bit level micro-instructions and determine template values and data transfers within the architecture.

In the embodiment of FIG. 6, the contents of a cell are illustrated in greater detail. For instance, the feedforward and feedback weights which also integrate the transfer function are shown in outline format. In addition, the local logic and memory functions are likewise illustrated in a similar fashion. In one embodiment, there is a main data bus across which data transfers can occur. As such, two way connections can be made between the data bus and the two analog and four digital memory units, the state (x) and input (u). Also, connection can be made from the logic output and the reference voltage to the data bus. Additionally, the logic can be implemented by programming, similar to that of programmable logic arrays. Similarly, the emerging reconfigurable logic arrays represent another option or embodiment.

As mentioned above, it is understood that the inventive concepts of the present invention may be applied to a variety of different technologies and implemented in a variety of different physical architectures, and as such, the present invention is not meant to be limited to integrated light sensing and processing architectures. For example, the same architectures can be applied to any system, such as an acoustic or sound based system, where there are multiple sensors arranged in a one, two, or three dimensional grid. Each sensor element on the grid may then respond to the same single physical quantity (e.g., frequencies of the audible sound spectrum). As such, each sensor may sense a different attribute of the same signal (e.g., each sensor tuned to a different frequency of the audible sound spectrum). This will measure the frequency pattern of the sound incident on the array. Further, one can also imagine hybrids of these two, such as measuring a color pattern.

Implementation of Several Cellular Model Circuits

Figure 7:
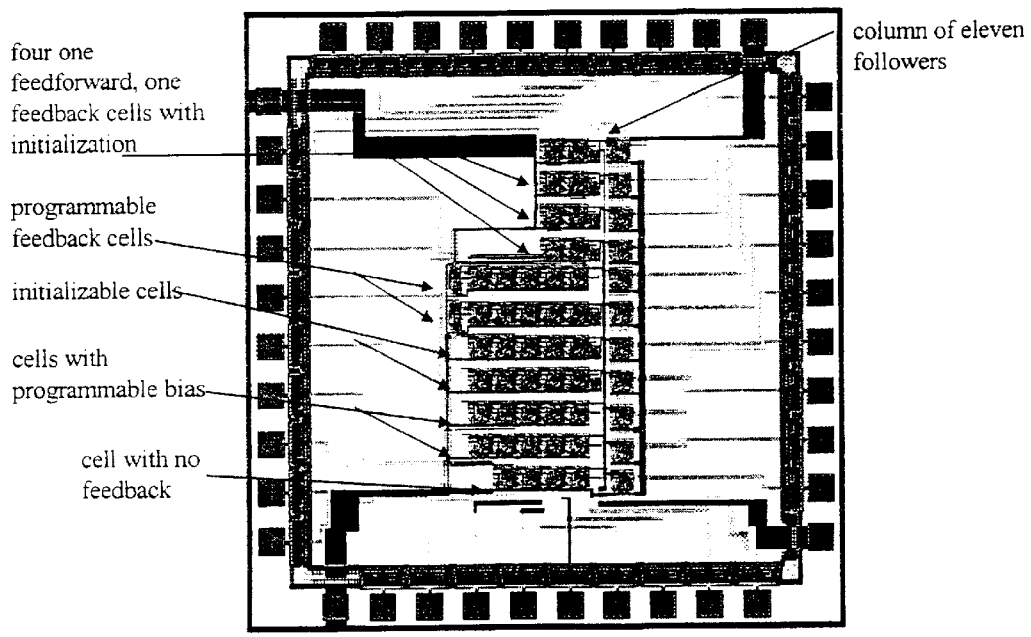
FIG. 7 illustrates an embodiment of the layout of a CMOS chip comprising several types of cellular units in accordance with the teachings of one embodiment of the present invention.

FIG. 7 illustrates one embodiment of the layout of a CMOS chip comprising several types of cellular units (e.g., VLSI adapted cellular dynamic architecture cell prototypes), in accordance with the concepts of the present invention. In one embodiment, the CMOS chip design may be manufactured to the MOSIS 2 micron ORBIT ANALOG process. Likewise, in one embodiment, the die size is implemented through the "TINYCHIP" package that is a 2.3 mm×2.3 mm area bonded to a 40 pin DIP.

In one embodiment of the CMOS chip, as illustrated in the embodiment of FIG. 7, the CMOS chip comprise eleven types of cells: Four One Feedforward—One Feedback Cells with Initialization; Two Programmable Type (Positive or Negative) Feedback Cells; Two Hardwired Feedback and State Initializable Cells; Two (+/−) Hardwired Feedback and Floating State Cells; and One Feedforward only Cell. In one embodiment, all outputs are made available through wide range followers at the outputs and all programmable cell parameters, i.e., feedforward and feedback weights, and bias are at 3 bit resolution (plus sign bit). External inputs are available via pins to set these weights through the pins.

Figure 8:
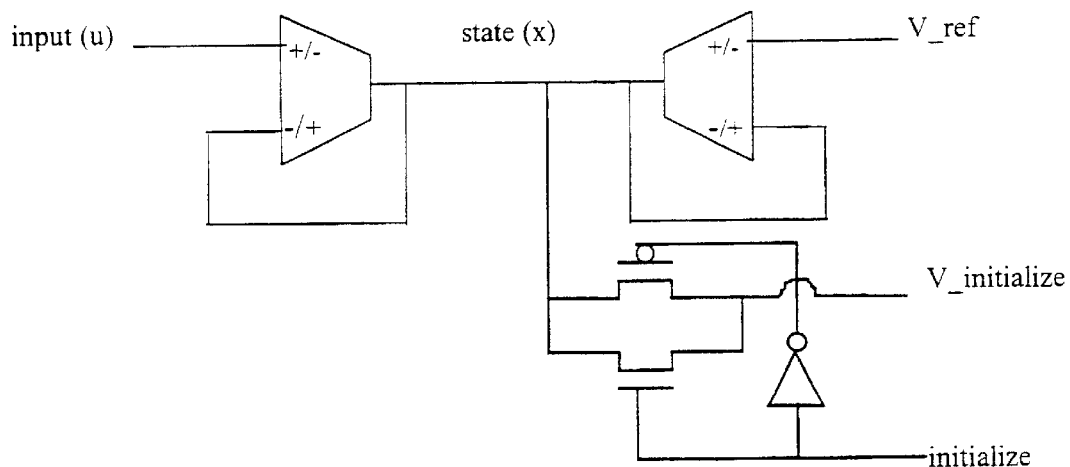
FIG. 8 illustrates an embodiment of a one input—one output cell with initialization in accordance with the teachings of one embodiment of the present invention.

FIGS. 8–11 illustrate these respective cells schematically. FIG. 8 illustrates one embodiment of the schematics of the four cells in a compact manner: Four One Feedforward—One Feedback Cells with Initialization. At the top of the chip of FIG. 7, there are four one input one output cells. There are four versions of this simple one input—one output simple cell. The four versions arise due to the four ways in which the permutations of the positive and negative feedbacks can be implemented. Four combinations of +/− terminals are possible and all of these may have been implemented. Moreover, all four cells include a state initialization mechanism to define x at the initial time instant (t=0). This means that the state can be initialized at any voltage that can be carried by on the specific microelectronic implementation. This is equivalent to defining an initialization point $x|_{t=0}$ in Equations (4) and (7). Both the feedforward and the feedback amplifiers have three bit programmable gain in this specific implementation.

Figure 9:
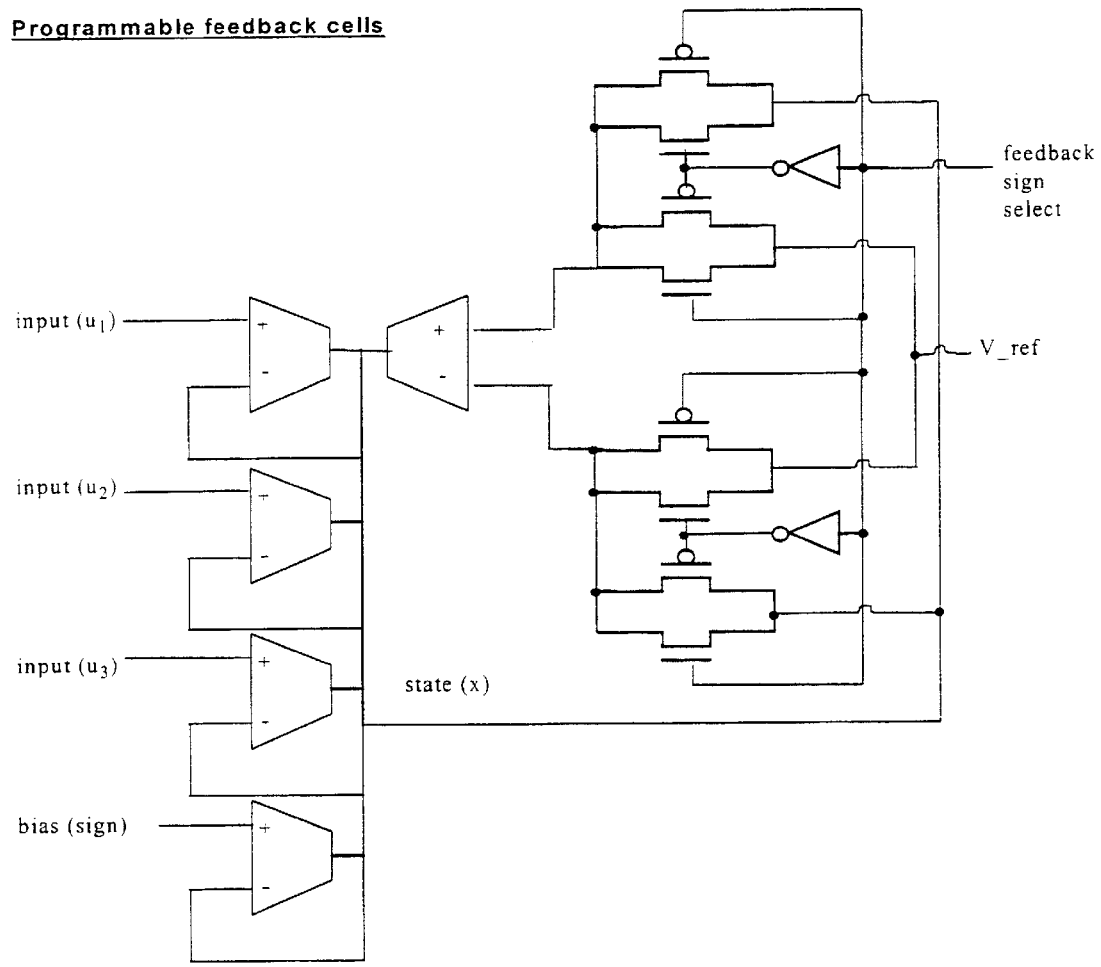
FIG. 9 illustrates an embodiment of a programmable type feedback cell in accordance with the teachings of one embodiment of the present invention.

FIG. 9 illustrates one embodiment of the schematics of the Two Programmable Type (Positive or Negative) Feedback Cells. Two three-input one-output selectable kind (+ or −) of feedback cells may be implemented. One of these also allowed for initialization of the state in a manner identical to the one illustrated in FIG. 8. FIG. 9 shows this type of cell without initialization. In one embodiment of the cell, as illustrated, there is an added delay of a pass-through transistor in feedback of the state. The two signals (the state node x and Vref) are directed to the terminals of the feedback weight amplifier based on the feedback sign select bit. In one embodiment, all amplifiers have three bit programmable gain.

Figure 10:
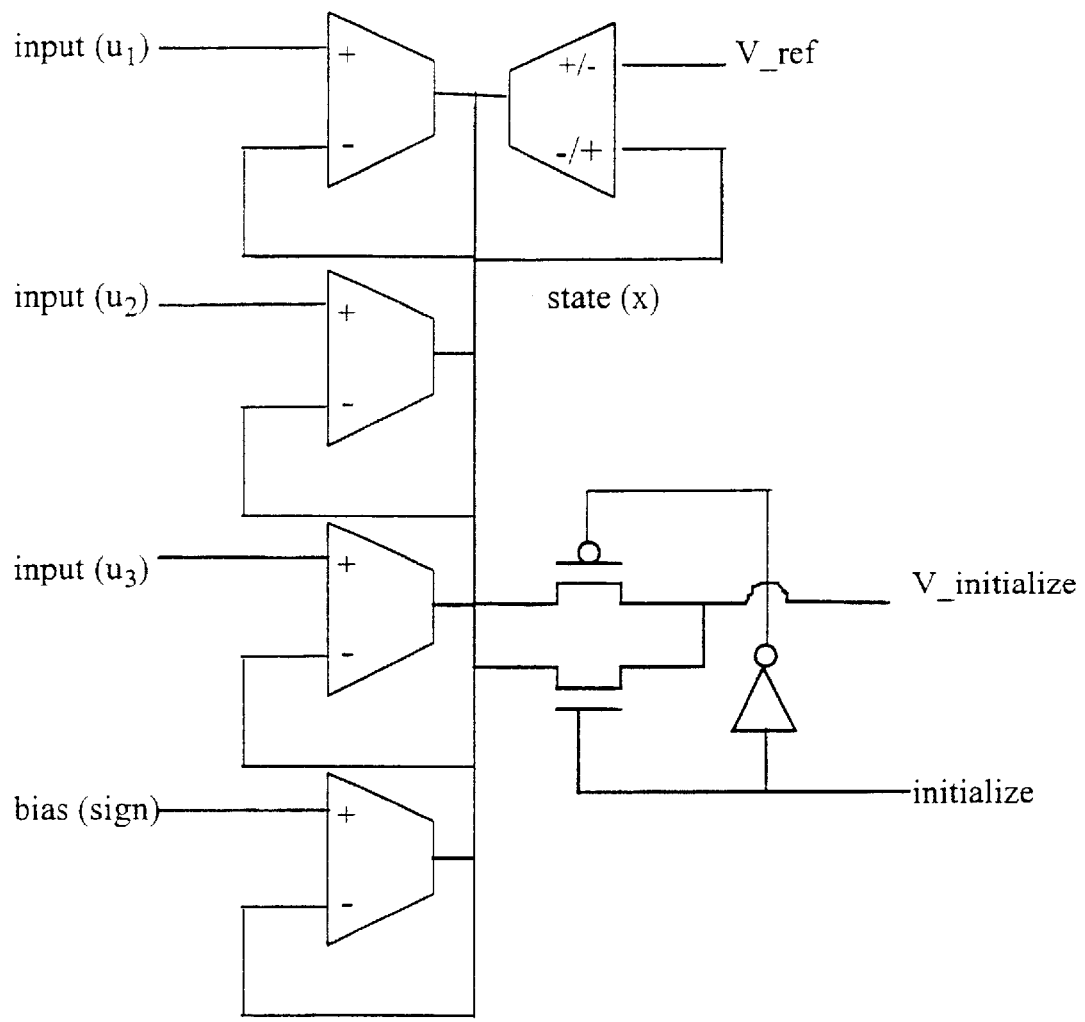
FIG. 10 illustrates an embodiment of a positive and negative feedback hardwired and state initializable cells in accordance with the teachings of one embodiment of the present invention.
Figure 11:
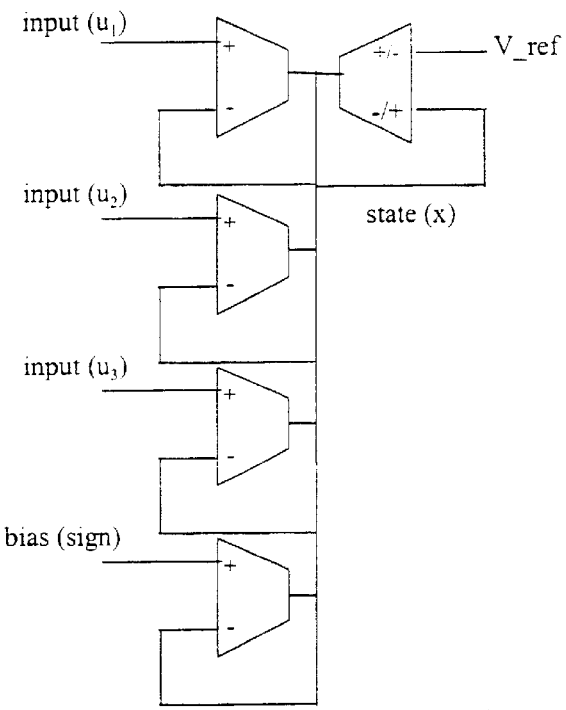
FIG. 11(a) illustrates an embodiment of two (+/−) hardwired feedback and floating state cells in accordance with the teachings of one embodiment of the present invention.
FIG. 11(b) illustrates one embodiment of a one feedforward only cell in accordance with the teachings of one embodiment of the present invention.
Figure 11:
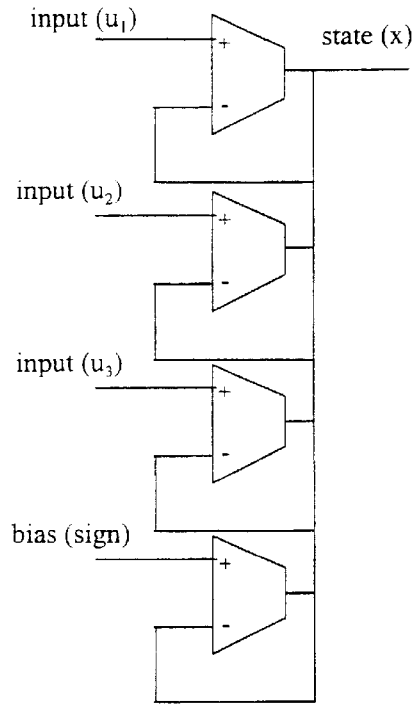

FIG. 10 illustrates one embodiment of the schematics of the Two Hardwired Feedback and State Initializable Cells. Two three input one output cells illustrated in FIG. 10 were included with initialization. These cells differ from the ones described in FIG. 9 only slightly. In one embodiment, the type of feedback is directly implemented rather than being programmable. Two combinations of +/− terminals are possible and both have been implemented. In one embodiment, both amplifiers have three bit programmable gain.

FIG. 11(a) illustrates one embodiment of the schematics of the Two (+/−) Hardwired Feedback and Floating State Cells. In one embodiment, these cells are identical to the ones described in FIG. 10 but do not contain state initialization circuits. Initial value of the state is thus undefined.

FIG. 11(b) illustrates one embodiment of the schematics of the One Feedforward only Cell. This is a three input one output cell with programmable bias. In one embodiment, the feedback component is eliminated. Thus the cell diverges from the cellular neural network paradigm and instead is useful for feedforward operations only.

Figure 13:
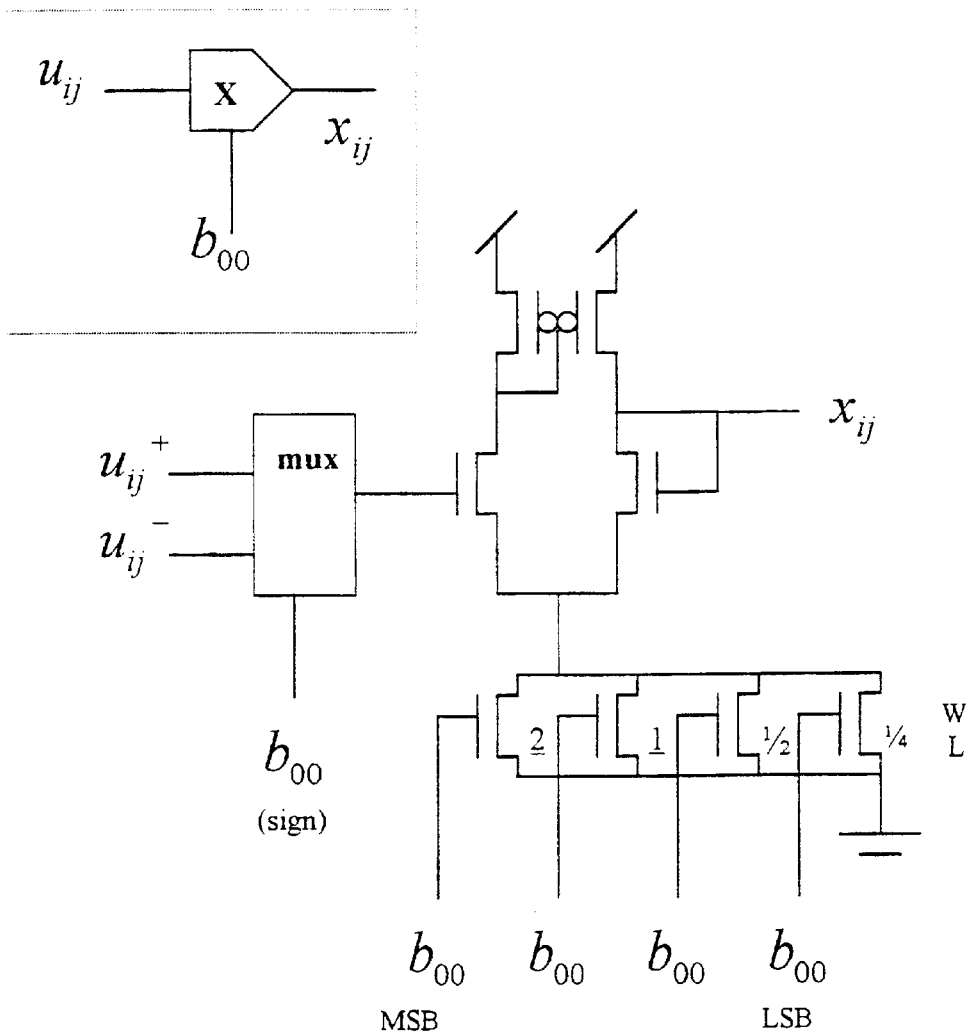
FIG. 13 illustrates an embodiment of a feedforward cell in accordance with the teachings of one embodiment of the present invention.

FIG. 13 illustrates one embodiment of a Feedforward cell. In one embodiment, the input u is always nonnegative but has a signed representation and positive entries of the B template select u+ and negative ones select u−.

Feedforward Weights and Image Convolution: Sample Operation

Convolution is a very common image processing step that precedes many vision tasks. It is often used as a technique-to generate a second (different) image from the original where desired features are enhanced and/or undesired characteristics (e.g., noise.) are suppressed. In one embodiment convolution can be described as a continuous spatial or temporal operation, but its application to sampled-images is discrete and involves a,.convolution kernel with discrete values.

This discrete convolution operation denoted by $\oplus$, between an image I and kernel k can be described as:

$$I \otimes k |_{x,y} = \sum_{i=-N}^{N} \sum_{j=-N}^{N} I_{x+i,y+j} k_{i,j} \qquad \text{Equation 10}$$

where I is the input image, x and y are the two dimensional image coordinates, and k is an (2N+1×2N+1) square kernel.

One can easily see the similarity between the feedforward weight input product sum $$\sum_{kl \in N_r(ij)} B_{kl}(u_{kl}(t), u_{ij}(t),) \text{ in Equation (1) and the sum in Equation (10).}$$

Thus, if one sets, I=0 and A=0, the steady state solution to Equation (1) is $$x_{ij}(t) = \sum_{kl \in N_r(ij)} B_{ij;kl}(u_{kl}(t), u_{ij}(t))$$

which is in fact equivalent to $I \oplus k|_{x,y_{ij}}$, where the second term is a normalized kernal.

The described VLSI adapted model performs a normalized operation which replaces the feedforward weights time the input values summation terms of the canonical model in Equation (1)

$$\sum_{kl \in N_r(ij)} B_{kl}(u_{kl}(t))$$

with $$\sum_{kl \in N_r(ij)} B_{kl} \tanh\left[\frac{q\kappa}{2kT}(u_{kl}(t) - x_{ij}(t))\right] \text{ in Equation (4)}.$$

Normalized convolution, denoted by $\oplus_n$ is very similar to the conventional convolution operation, except that the output is normalized by the sum of kernel entries. Because kernels are the same across the whole image, the result is essentially division by a normalization factor common to the entire image. The advantage is that the dynamic range of the resulting image is essentially the same as that of the input image.

$$I \otimes_n k\big|_{x,y} = \frac{\sum_{i=-N}^{N}\sum_{j=-N}^{N} I_{x+i,y+j} k_{i,j}}{\sum_{i=-N}^{N}\sum_{j=-N}^{N} k_{i,j}} \quad \text{Equation 11}$$

For the implementation of the normalized convolution described above, input voltage values are loaded with input voltages corresponding to the image, and gains from the entries of the kernel. Since the conductances (or gain values) are necessarily positive, to implement negative kernel values with this approach, one needs to be able to define negative input voltages and select negative polarity for the input to the transconductance amplifier for which a negative kernel value is desired. This cuts the dynamic range of images in half, although the range of kernel entries remain unaffected. One can view the cell arrangement in FIG. 11(b) in this light, provided that the bias amplifier is ignored.

Figure 12:
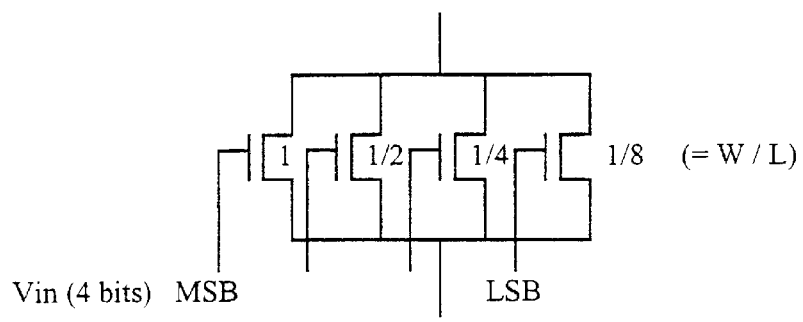
FIG. 12 illustrates an embodiment of digital input accommodation via parallel transistor cascading in accordance with the teachings of one embodiment of the present invention.

Sample Operation:

For instance, in a sample operation, a four bit plus sign representation, shown in FIG. 12 (digital input accommodation via parallel transistor cascading), may used as entries of the B template in Equations (1) and (4) and take on values equivalent to the range of −3.75 and 3.75 in increments of 0.25. In one embodiment, the cell is equivalent to the feedforward configuration shown in FIG. 11(a) provided that the gain of the amplifiers are sent by the B template. With more area and more bits higher resolution and dynamic range would be possible.

In the sample operation, other parameters may be as follows:

$0 < u < 1$ $u+ = V\text{ref} + u$ $u- = V\text{ref} - u$ $-3.75 < b < 3.75$ u min $< x <$ u max Vref may be the representation of zero in this architecture. One suggested value for Vref is the midpoint between ground and the power supply of the microelectronic implementation.

Implementation of sign is based on selection of the u+ or u−. Note that this also creates the opportunity to implement negative u. In other words, it is possible to accommodate u<0 values in this structure, as well. In that case, the parameters may be as follows:

$-1 < u < 1$ $u+ = V\text{ref} + u$ $u- = V\text{ref} - u$

Specific realization of the −3.75 to 3.75 range realizing different values of template B in the architecture yields the following:

| b = | b sign (v) | $b^3$ (MSB) | $b^2$ | $b^1$ | $b^0$ (LSB) |
|---|---|---|---|---|---|
| −3.75 | 0 V | 1 V | 1 V | 1 V | 1 V |
| −2.00 | 0 V | 1 V | 0 V | 0 V | 0 V |
| −1.00 | 0 V | 0 V | 1 V | 0 V | 0 V |
| −0.50 | 0 V | 0 V | 0 V | 1 V | 0 V |
| −0.25 | 0 V | 0 V | 0 V | 0 V | 1 V |
| 0.25 | 5 V | 0 V | 0 V | 0 V | 1 V |
| 0.50 | 5 V | 0 V | 0 V | 1 V | 0 V |
| 1.00 | 5 V | 0 V | 1 V | 0 V | 0 V |
| 2.00 | 5 V | 1 V | 0 V | 0 V | 0 V |
| 3.75 | 5 V | 1 V | 1 V | 1 V | 1 V | where Power=5 V and logic 1=5 V. We can select 1 V as bias to operate the bias transistors around threshold. In one embodiment, the state node (x) is referenced to V ref and does not need a signed representation. Positive entry values for the feedback template "A" can be used to steer x to the + terminal and negative entries steer it to the—terminal of the wide range differential amplifier. In the four bit plus sign representation A values may likewise take on values in the range −3.75 and 3.75 in increments of 0.25. With more area and more bits higher resolution and dynamic range would be possible. Other parameters are as follows: −3.75<aij<3.75 and 0<x<Vdd.

As such, the feedback configuration of the feedforward weights provides for some safety against the tendency of active current computation units to be attracted to a power supply rail.

Figure 14:
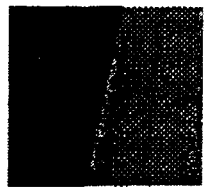
FIG. 14 illustrates an embodiment of the results from a three input one output cell with no feedback connections in accordance with the teachings of one embodiment of the present invention.
Figure 14:
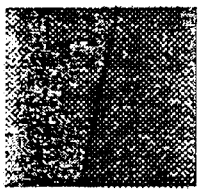
Figure 14:
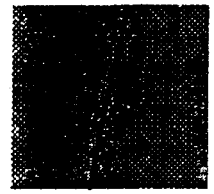
Figure 14:
Figure 14:
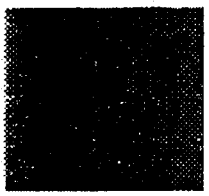
Figure 14:
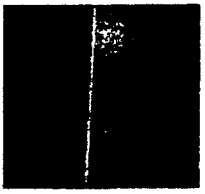

Two real images were captured using a CCD camera and presented to the chip three inputs at a time. Three weights for the inputs are set to represent the one dimensional vertical edge kernel of 1 0−1. In the present sample operation, each pixel is presented in this fashion. In the sample operation, the whole image was presented three pixels at a time along the horizontal direction to the model circuit shown in FIG. 11(b) with the bias amplifier disabled, the result is shown in FIG. 14.

DUAL DISTRIBUTED ARCHITECTURE

Figure 15:
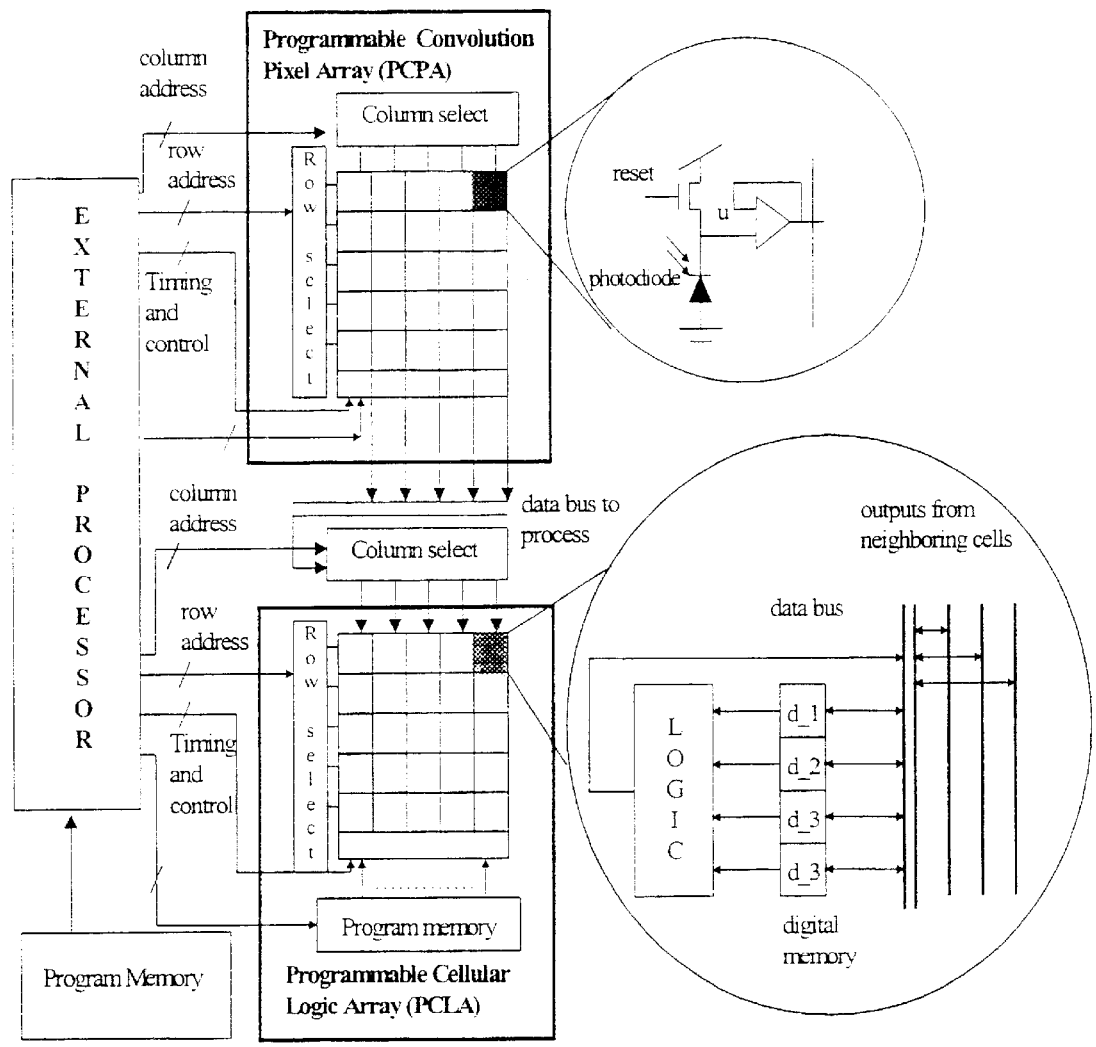
FIG. 15 illustrates an embodiment of a dual distributed cellular architecture in accordance with the teachings of one embodiment of the present invention.

One embodiment of the present invention, as illustrated in FIG. 15, introduces a Dual Distributed Architecture, illustrated as a 5×5 array. In one embodiment, the Dual Distributed Architecture contains two distinct structures: (i) programmable convolution array PCA, a sensing grid with convolution capability, which may also include some short term memory, and (ii) PLA, a programmable logic array and memory area on which transformations or alternate representations of the sensory data can be recreated. In one embodiment, both areas compute in parallel and communicate with each other as needed in a serial but random access fashion. Also, it is primarily the programmable cellular logic array (PCLA) that communicates with the outside realm, which potentially includes a conventional digital signal processor, microprocessor or microcontroller.

In view of the ideal of leveraging the speed of the implementation medium (most commonly silicon microelectronic circuits) against the large area requirements of a cellular processor, we view again the components of the cell of a specific implementation, which are listed in Dynamic Cellular Architecture above, namely: (1) a photodiode and circuits for active light sensing; (2) transconductance amplifiers for feedforward template weight multiplication; (3)

wide range transconductance amplifiers for feedback template weights; (4) analog/single bit digital local dynamic memory cells; (5) a data bus for transfers; (6) local programmable logic; and (7) read/write data controls.

Practical real-world concerns and implementations for integrated cellular sensor-processor systems generally dictate consideration of the following: (1) the sensors be manufacturable and embedded into the processing system; (2) the resolution of the sensory part of the system be close to that available commercially; (3)the fill factor(ratio of sensor area to the total area of each cell) be reasonable for the application; (4) the sensor performance be maintained with shrinking technology size; (5) a set of operator sizes that take in data from a large neighborhood. These are simply factors to consider when implementing an integrated cellular sensor-processor system, but do not have to be specifically adhered to, and as such, the aforementioned factors are not intended to limit the scope of the present invention Nevertheless, taking a systematic approach to meeting the objectives itemized above, the following factors, likewise, should generally be noted: (1) to improve the resolution one needs to shrink the cell; (2) to improve the fill factor, one needs to increase the light sensitive areas; (3) to keep the sensor operational, one may need to build the sensors (or the whole chip) using a larger technology which again means that one needs to make the cell yet smaller; and (4) to increase the neighborhood size, one may need to build yet a larger cell that connects to more of its neighbors. Again, these are simply factors to consider when implementing an integrated cellular sensor-processor system, but do not have to be specifically adhered to, and as such, the aforementioned factors are not intended to limit the scope of the present invention.

In this manner, one can also implement (in the feedfoward connections) arbitrary size neighborhood, or kernels, as they are commonly called in image processing, including a kernel that is as large as the whole sensor array itself, but only with one such kernel at a time. This leverages the speed of the implementation medium against area requirements of the processor.

The dual distributed architecture generally provides three significant advantages as compared to currently implemented or existing architectures.

First, the computational concept of the architecture is simpler and far more conventional than the concept of the cellular neural network of prior art, which employ nonlinear circuit dynamics. Moreover, practicing engineers already will need far less training to implement this architecture. The way operations in the dual distributed architecture are programmed is far more straightforward than the way in which one needs to go about determining or finding the correct A, B, x(0), and I parameters, as compared to currently implemented or existing architectures.

Second, since the role of nonlinear dynamics is minimized, electronic circuit anomalies, such as mismatches or noise inherent to the substrate on which the architecture is built, have far less impact on the outcome of the computation. This makes the implementation a lot easier and cost effective to manufacture.

Third, the architecture of the dual distributed architecture, as the name implies, comprises two parts, and each of those parts serves a separate function. In other words, each part is functional on its own and can be implemented without the other. The first part of the dual distributed architecture is the programmable convolution array PCA, which in one embodiment comprises a sensing grid with convolution capability, which could also include some short-term memory. The programmable convolution array PCA part performs arbitrary linear transformations of the whole sensory data or parts of the sensory data. The desired weights of the individual elements can be directly programmed. The second part dual distributed architecture is the Programmable Cellular Logic Array (PCLA). In one embodiment, the PCLA is cellular, which means that each of the elements of the array connected to a set of its neighbors. The PCLA, however, is not a neural network and in one embodiment relies-on conventional logic to perform its operations. In one embodiment, the actual logic can be implemented with conventional digital logic or non-conventional analog logic gates, such as but not limited to AND OR XOR. Additionally, in one embodiment, there can be a state-machine (i.e., a mini computing engine) at each of the elements. For stand alone operation, each element of the PCLA could be equipped with a sensor, or data could be scanned in from an external source.

The Signed Output Sensor (SOS)

As for some types of implementations of the convolution function, e.g., those using non-negative gain amplifier circuits, it may be necessary for each sensor to produce dual outputs.

Accordingly, depending on the nature of the sensor, the way such dual output is produced may be different. For sensors that measure non-negative values referenced to zero (e.g., light), there may need to be a (+) and a (−) pixel output. Positive (+) output is used for feeding into the amplifier if it contains a positive kernel value. Correspondingly, the negative (−) pixel output may used for negative kernel value. A one dimensional example is given below.

Suppose that one needs to implement a one dimensional edge kernel of [1 0−1] on a light sensitive grid. The equivalent arithmetic operation is the sum pixel[i−1]+(−pixel[i+1]). Since current summation can be used, one needs to add the current for the positive representation of pixel[i−1] to the current for negative representation of pixel[i+1].

Figure 16:
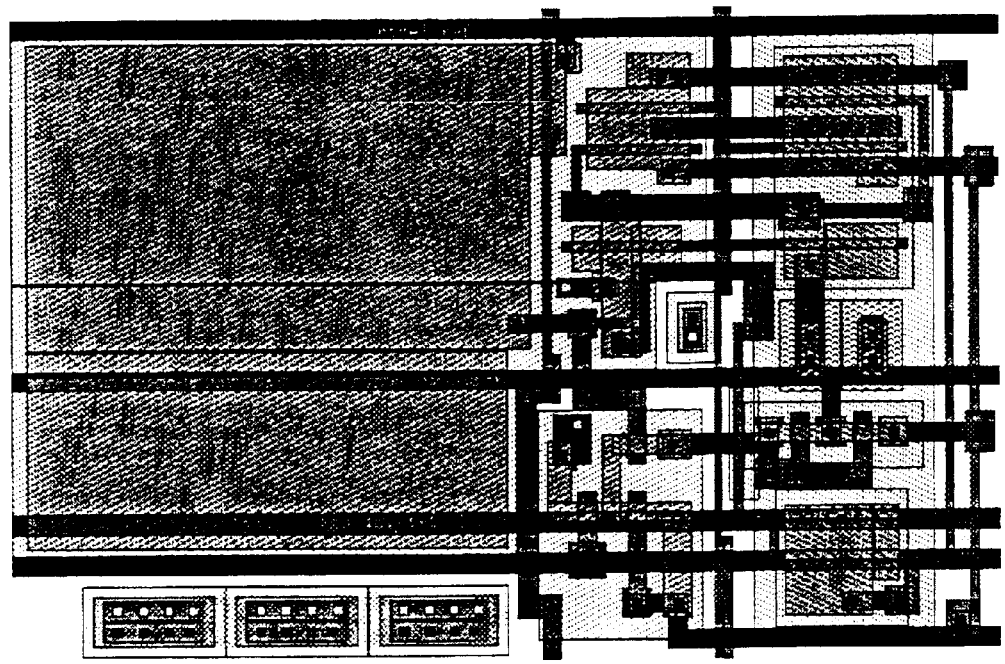
FIG. 16 illustrates an embodiment of the layout of a signed sensor in accordance with the teachings of one embodiment of the present invention.

FIG. 16 illustrates one embodiment of an exemplary layout of such a single signed output active sensor. In the embodiment of FIG. 16, the active area is a square of 100λ×100λ and the whole cell covers a 195λ×130λ area. The (grounded) METAL2 layer covering the areas of the cell that should not be exposed to light is not shown.

Figure 17:
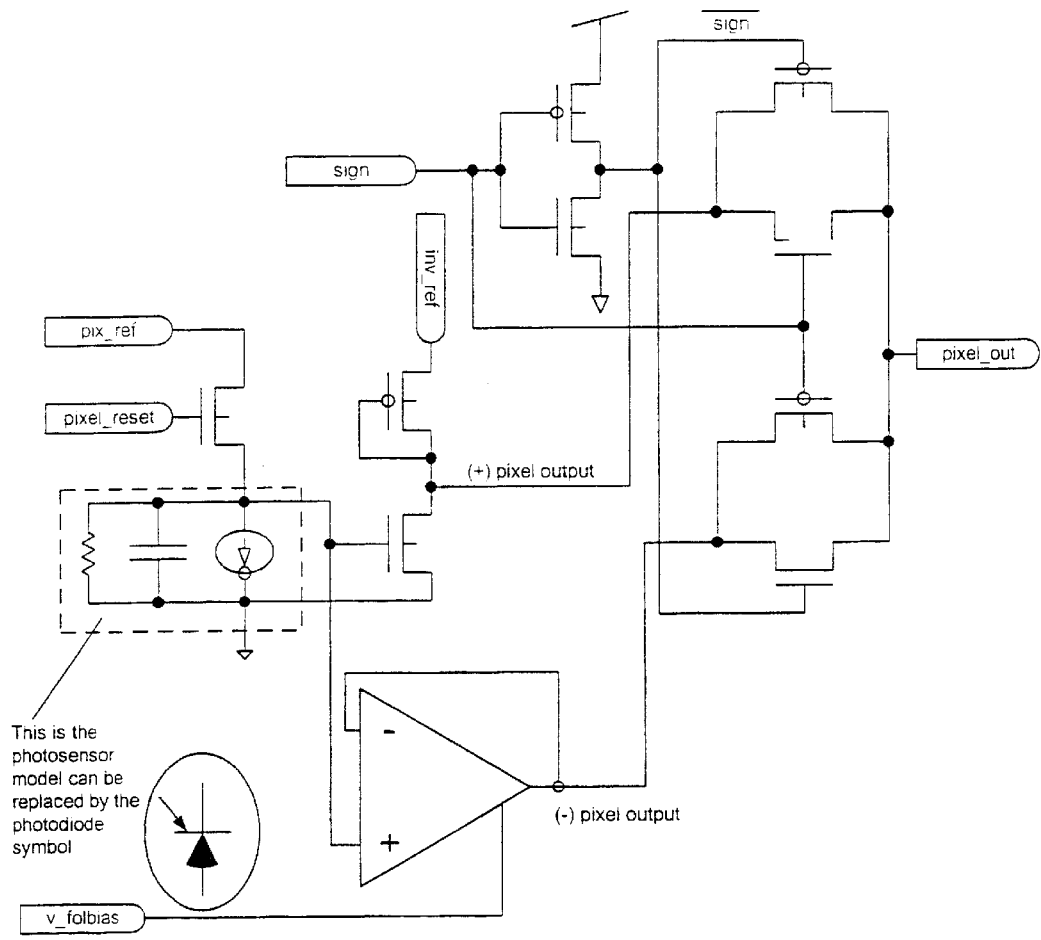
FIG. 17 illustrates an embodiment of a dual output light sensing pixel in accordance with the teachings of one embodiment of the present invention.

Likewise, the corresponding schematic of the signed sensor is illustrated in FIG. 17, where the positive and negative pixel representations are marked. In one embodiment, the additional follower is employed since the photocurrent is very small and the photosensing node should not be perturbed.

Programmable Convolution Array (PCA)

Figure 18:
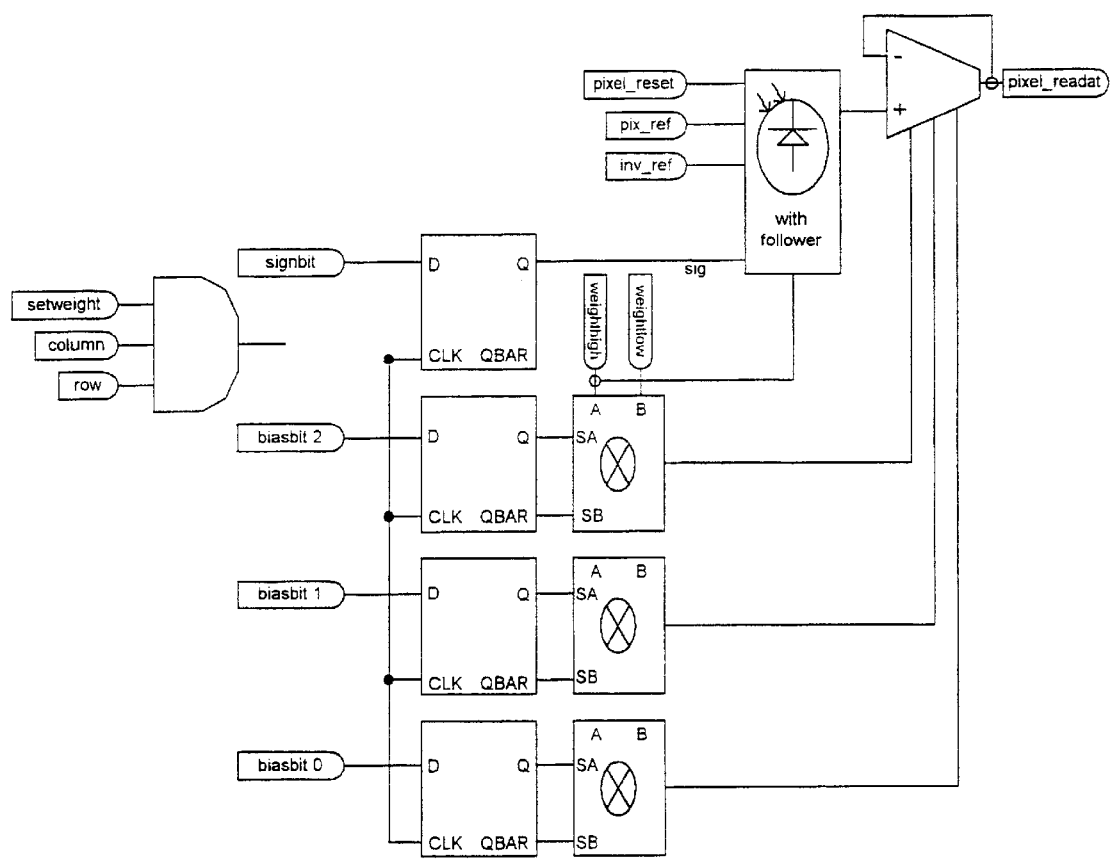
FIG. 18 illustrates an embodiment of a schematic diagram of a cell of a programmatic convolutiuon array (PCA) in accordance with the teachings of one embodiment of the present invention.

FIG. 18 illustrates one embodiment of a design of one element of a light sensing PCA. In one embodiment, each pixel cell can be addressed by the combination of row and column select signals. Likewise, weight bits can also thus be written to selected pixels. Pixel midpoint determines the "0" value—i.e., no light, of the signed pixel value representation. Reset pixel will charge the pixel output to that value. In one embodiment, a dedicated ground signal need not be routed since a metal layer covering the circuits (with opening at light sensitive areas) can be grounded. In the embodiment of FIG. 18, each cell contains: (1) one signed output sensor (SOS); (2) four D flip flops for storage of three bit weight and sign; (3) three multiplexers; (4) one wide range transconductance amplifier connected in the unity follower configuration; and (5) a three input AND gate.

Figure 19:
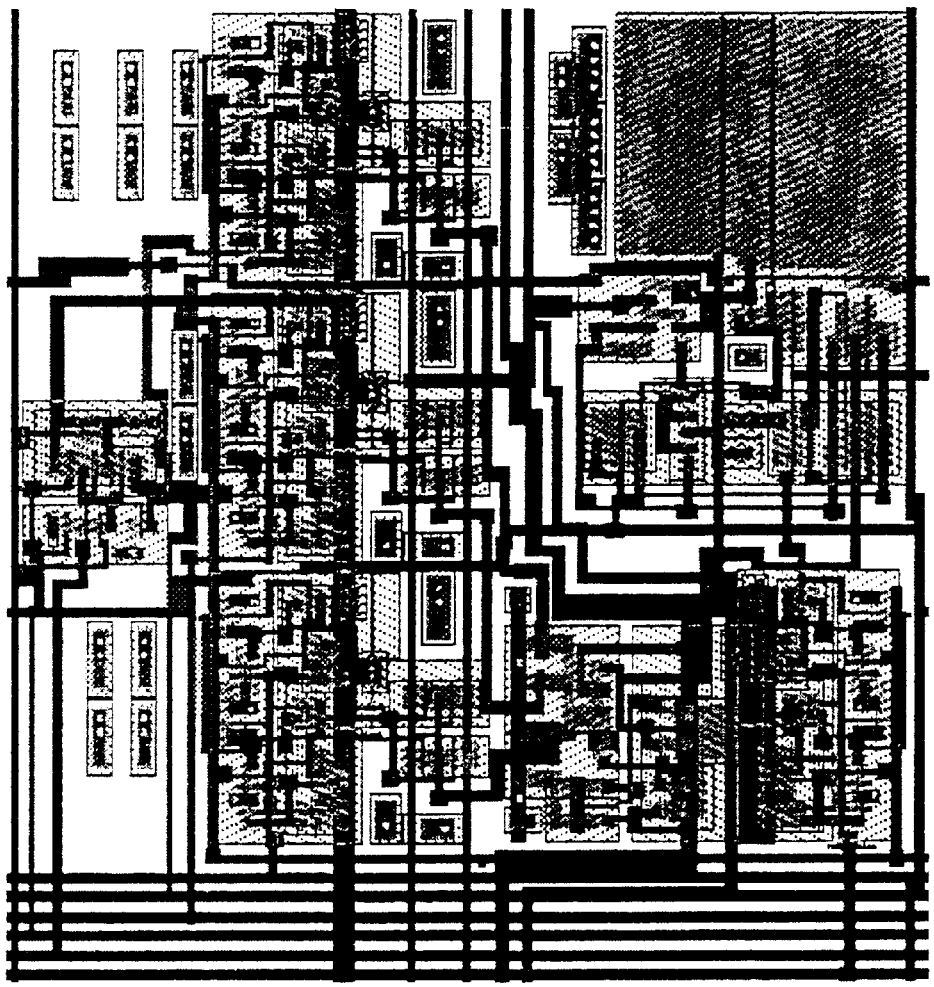
FIG. 19 illustrates an embodiment of the layout of a single cell of the programable convolutiuon array (PCA) in accordance with the teachings of one embodiment of the present invention.

In one embodiment, the size of the cell can be reduced significantly, since as the layout of the single cell in FIG. 19 shows, there are some empty spaces. Smaller feature sizes and added metal layers will no doubt compact the cell further. A significant area savings would result from a dynamic memory cell, since each kernel would be used for a short period of time. Several data and control signals are generally routed to each cell.

Figure 20:
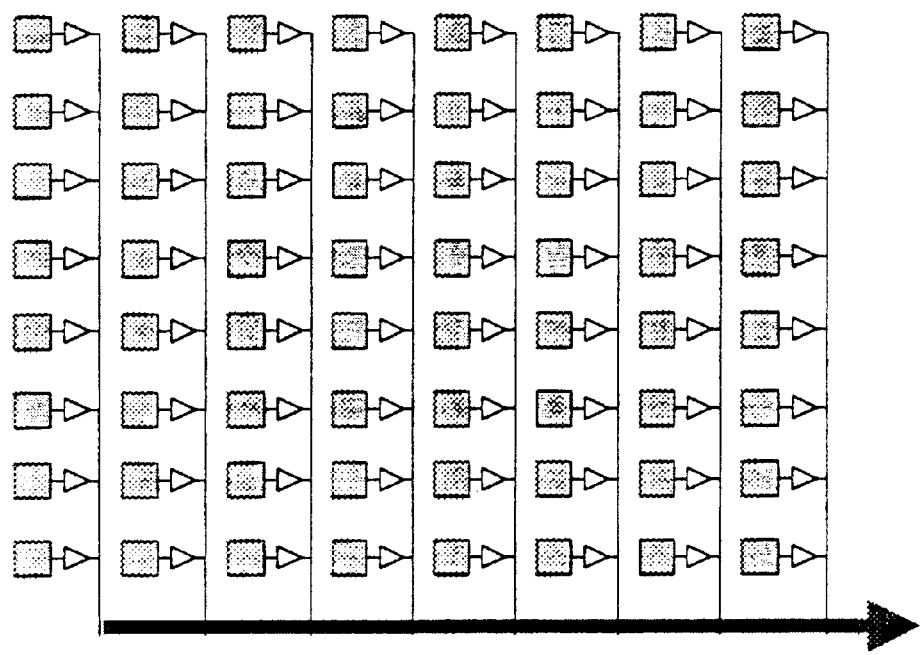
FIG. 20 illustrates an embodiment of the outputs of the programable convolutiuon array (PCA) elements in accordance with the teachings of one embodiment of the present invention.
Figure 20:
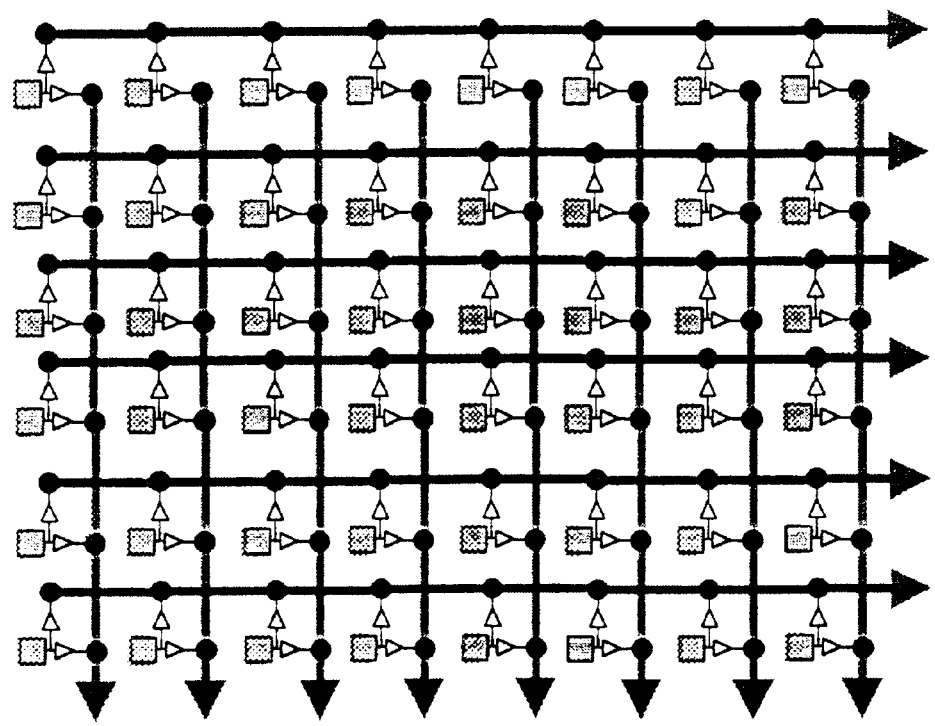

In one embodiment, the controls signals common to all cells include: (1) clock weight, (2) reset photodiode (or sensor), and (3) sign. Addressing signals are row and column. In one embodiment, the data signals common to all cells include: (1) pixel reference, (2) inverter reference, (3) weight high, (4) weight low, (5) weight MSB, (6) weight MID, (7) weight LSB. Furthermore, in one embodiment, as illustrated in FIG. 20, elements of each row have a common row select signal and elements of each column have a common column select signal. Accordingly, the output of each cell may be summed onto a common line. Alternately, outputs can be combined along columns, rows, or blocks, or along alternate designations.

Figure 21:
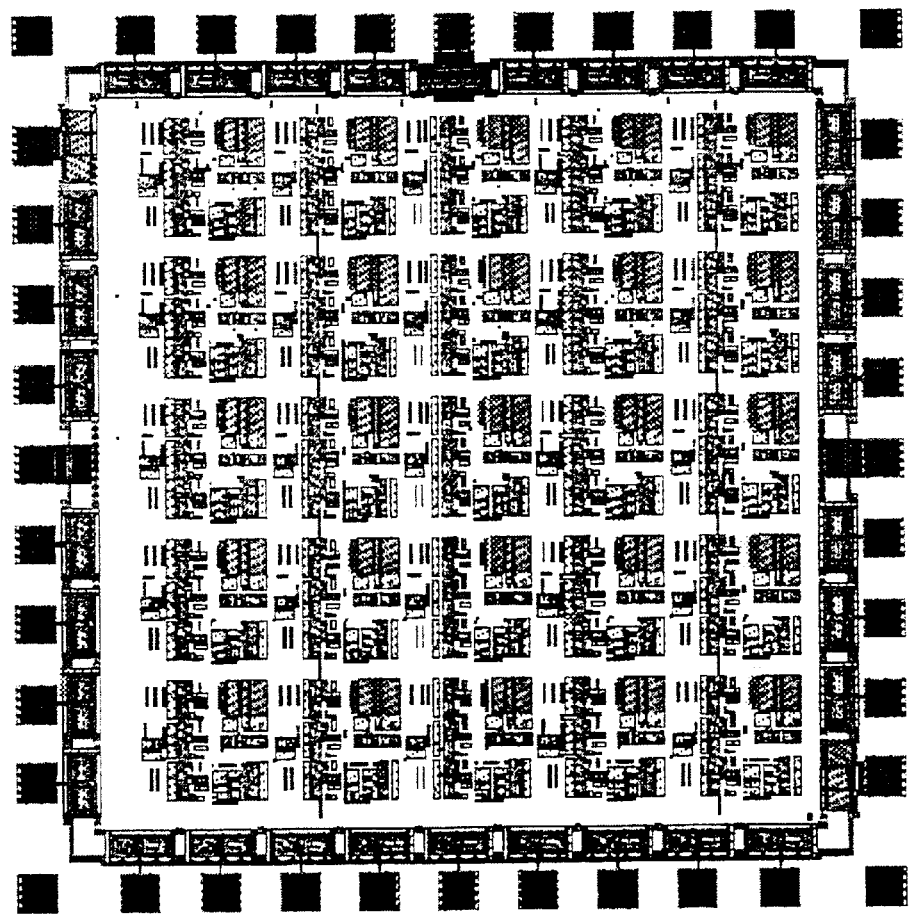
FIG. 21 illustrates an embodiment of a 5×5 programable convolutiuon array (PCA) with I/O pads in accordance with the teachings of one embodiment of the present invention.

FIG. 21 illustrates an example PCA layout of 5×5 pixels. In the embodiment of FIG. 21, each of the 25 elements use four weight bits (three magnitude and one sign) which are stored in D-flip-flops. Accordingly, the weight bits are clocked in only when both the row and the column are selected, as well as when the weight clock bit is active. The outputs of the weight flip flops the select between the weighthigh and weightlow. In one embodiment, the wide range transconductance amplifier at the output stage has three bias transistors with W/L ratios of ¼, ½, and 1, each corresponding to the magnitude bits. If all weights are zero, the pixel does not contribute any current to the output. If any of the weights is non-zero, based on the sign, the pixel makes a positive or negative current contribution to the overall reading. The data signal, weighthigh also determines the gain on the photosensor. In one embodiment, the D flip flops could be replaced with dynamic memory to save silicon area. In one embodiment, the design may be implemented in a 2 micron CMOS technology design with its pads configured to fit into an area of 2.3 mm×2.3 mm, and is embedded in a 40 pin DIP chip package. All 25 pixel outputs are summed on a common output line in this example implementation. One can select different signs and weights for each of the cells and thus perform arbitrary convolution operations. Arbitrary 4-bit kernels up to 5×5 can be programmed in this particular example implementation.

PCA Process

Figure 22:
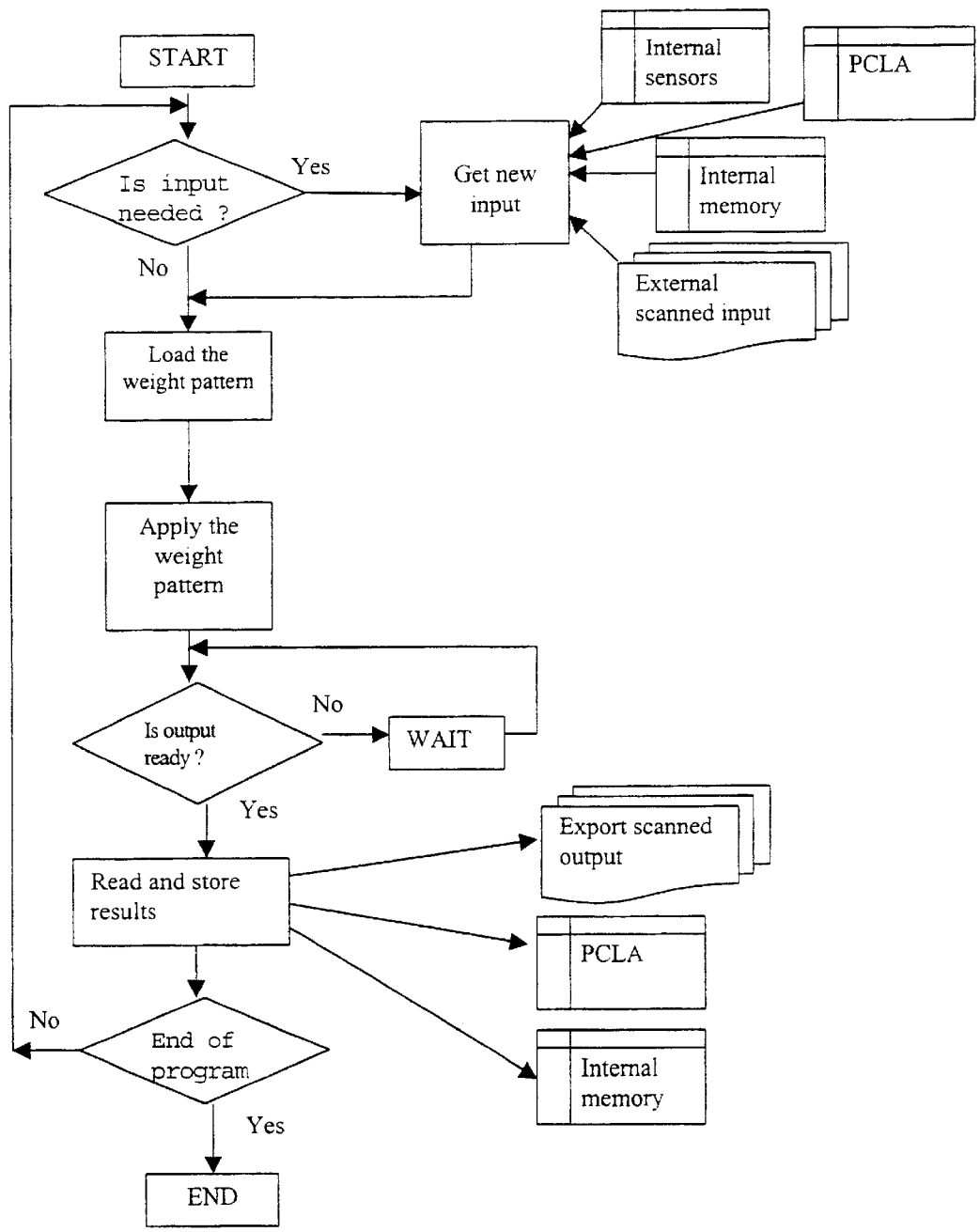
FIG. 22 illustrates an embodiment of an operational process in flow chart format for a programmable convolution array (PCA) of the dual distributed architecture in accordance with the teachings of one embodiment of the present invention.

FIG. 22 illustrates one embodiment of the operational process of the Programmable Convolution Array (PCA) illustrated above. In one embodiment, before the process begins, the necessary weight patterns to be applied to the array for all of the operations to be performed is determined. Accordingly, in one nembodiment, a program is made of operations needed to complete the task, such that, each step of the program specifies an operation, where each operation is defined by the pattern of weights to be applied to the array In one embodiment, it is possible to simply obtain the weight pattern from results of previous operations. In one embodiment, the program may be stored externally or on the same chip where the array is implemented. In an alternate embodiment, each cell of the array can have its own program memory.

Referring back to FIG. 22, one embodiment of the operational process of the Programmable Convolution Array (PCA) illustrated above, may be implemented through the following process:

1. START
2. If previous operation is complete or if new data is needed, get new inputs. These inputs may come from continuous or discretely sampled data from sensors built into the array, or alternately, they can be scanned into the input nodes from an external data source by employing an appropriate scanning mechanism.
3. Apply the weight pattern of the instruction, either externally or from internal stored program memory.
4. Allow sufficient time for the computation to complete: i.e., for the electronic circuits to reach a point where the change of the value of the output of the array equals zero. For active sensors, which do not produce a static output, there may be a specific optimum time instant to sample their output. Another option is that the output itself is a time variant waveform.
5. Read and store the output(s) of the array. The output can be stored externally or internally. If the PCA is used in tandem with a PCLA, then the output can also be sent to PCLA.
6. Wait for next operation.
7. If end of program, go to (END).
8. Go to (2).
9. END.

Programmable Cellular Logic Array (PCLA)

The output of a convolution operation performed by the PCA is usually an analog current or voltage value. While this rapid arbitrary size kernel convolution operation is extremely useful, there are many early vision operations that require further processing of the results of many convolution operations. The programmable cellular logic array (PCLA) is a way of implementing this stage.

In one embodiment, the PCLA is a processing device that processes binary or digital data using a set of fixed or programmable logic elements arranged on a cellular grid. Accordingly, if the PCLA is used with a PCA, the sizes of the two arrays could be the same or different. In one embodiment, the PCLA grid can function as a "scratch-pad" for a set of iconic operations, such as shape detection, contour following, pattern matching, all performed using the outputs of the PCA or external outputs, potentially at different resolutions than the data received.

Furthermore, each element of the PCLA can be addressed like a memory array to which the input (e.g., outputs from the PCA) can be applied or stored, and from which results can be retrieved. Added functionality would result from the ability to transfer bits between neighbors (analogous to shift operations) or to arbitrary locations of the cellular logic grid (random access transfers).

Figure 23:
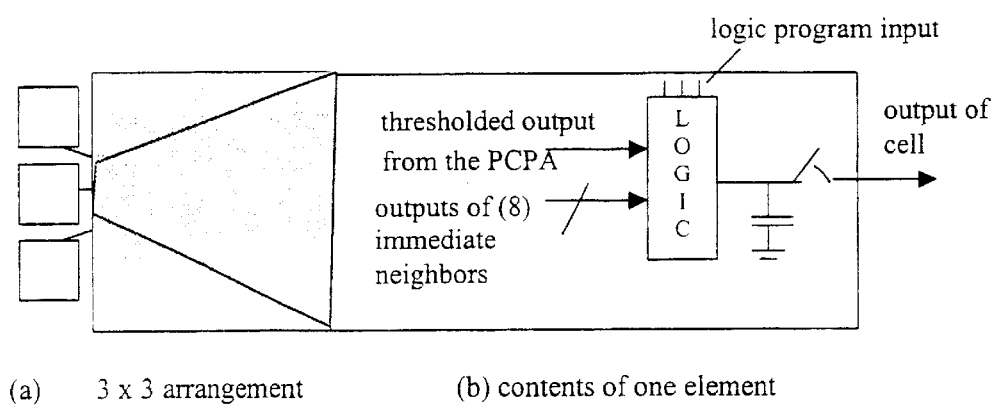
FIG. 23 illustrates an embodiment of an element of the programmable cellular logic array (PCLA) in accordance with the teachings of one embodiment of the present invention.

The embodiment of FIG. 23 illustrates a simple implementation of the elements of the programmable cellular logic array (PCLA). In the embodiment illustrated in FIG. 23, only the center cell connections are shown to prevent clutter, also in the embodiment shown, the cell output has been staged to prevent race conditions. In this embodiment, all operations are strictly local. This is not a limitation of the invention. In one embodiment, global operations such as matching with a global pattern, reset, set, and other can also be implemented into the PCLA. Furthermore, added functionality could be realized (1) with increased connectivity, where each cell receives more inputs, such as those from additional cells in the neighborhood, or from arbitrary cells on the array via memory-like addressing; and (2) with increased cell memory, where the results of previous operations can be stored in the cell. In one embodiment, the logic within the cell should be programmable. In fact, the program may change many times during the operation. Sample logic functions could be AND, OR. INVERT, XOR etc. of a set of the available inputs.

In one embodiment, the PCL,A would benefit from the use of the emerging reconfigurable field programmable gate arrays (FGPA's). This is a relatively new field, however, researchers are keenly looking at ways to capitalize on the inherent flexibility in these devices to facilitate the building of a better computing paradigm.

One specific concept in this domain, termed the plastic cell architecture, brings forth a new circuit type that is laid out as an array of identical computing elements or cells which could dynamically reconfigure themselves for specific problems. This new computing paradigm offers a novel feature beyond the common reconfigurable FPGA concept, where so far, it's been possible to reconfigure circuits only via software downloaded to one or more FPGA and the chips then directly execute the prescribed functions as hardwired circuits. This added feature is the ability of one circuit to dynamically configure another circuit. The resulting processing array is able to mimic the ability to create specialized cells, which in turn allow a cellular array like the PCLA to configure itself based on outputs of its neighbors, or of itself. This level of data driven performance allow for implementation of very complex functions from very simple rules.

PCLA Process

Figure 24:
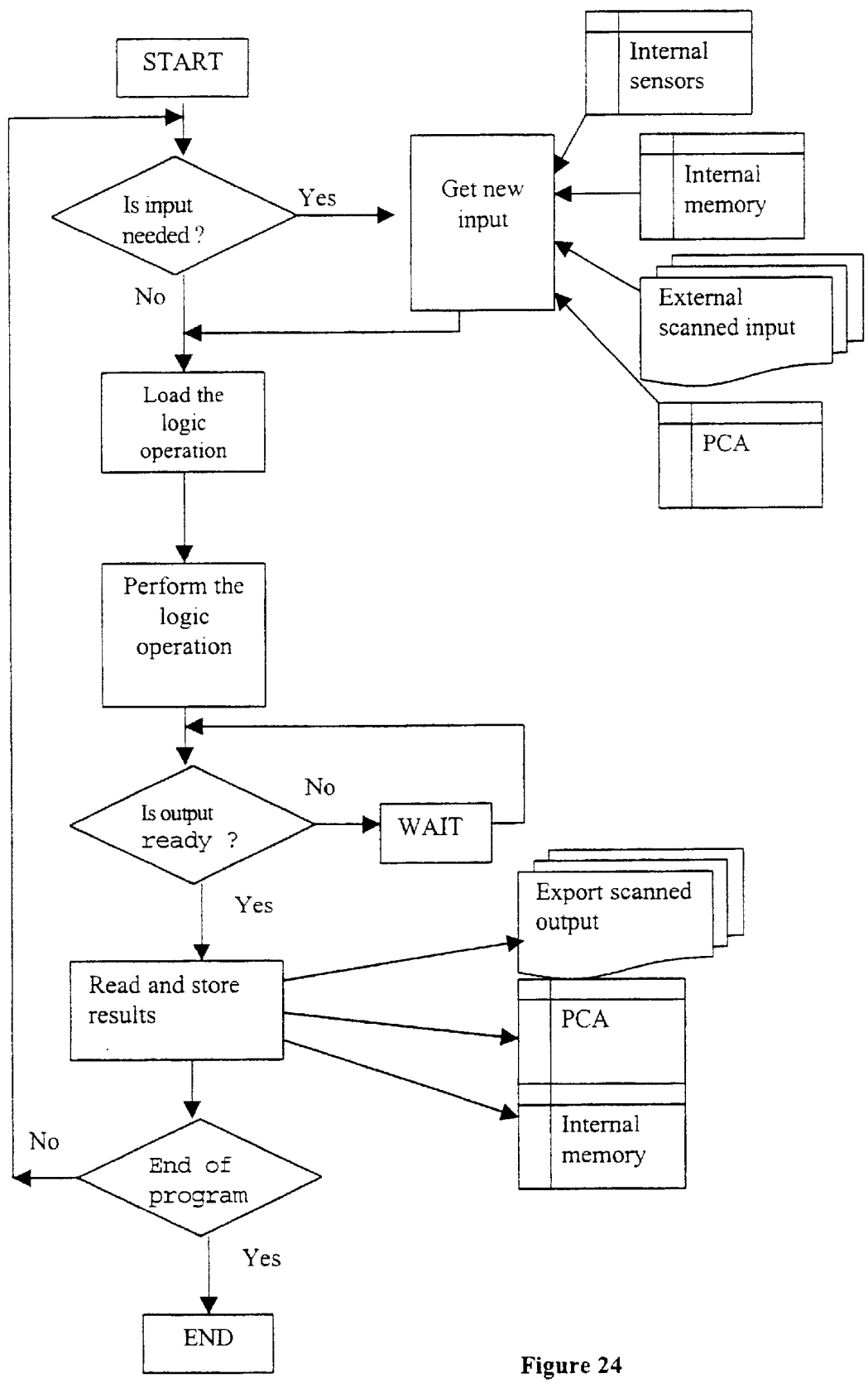
FIG. 24 illustrates an embodiment of an operational process in flow chart format for a programmable cellular logic array (PCLA) of the dual distributed architecture in accordance with the teachings of one embodiment of the present invention.

FIG. 24 illustrates one embodiment of the operational process of the Programmable Cellular Logic Array (PCLA) illustrated above. In one embodiment, before the process begins, the necessary local and global logic functions that are needed is determined. These logic functions should already be implemented in each element of the array where they need to be performed, or it should be possible to program the logic contained in each element of the array to perform the logic function needed. In general, an operation is defined by the pattern of operations carried out by the individual elements of the array.

Accordingly, a program is made of the sequence of operations needed to complete the task, such that each step of the program specifies one or more functions to be performed by each element of the array. In one embodiment at any given time, all elements may be performing the same function or different functions. Likewise, in one embodiment, it is also possible to obtain the next operation conditional upon or based on results of one or more previous operations. In one embodiment, the program may be stored externally or on the same chip where the array is implemented. In an alternate embodiment, the program memory may be local, i.e., each cell of the array can have its own program memory.

Referring back to FIG. 24, one embodiment of the operational process of the Programmable Cellular Logic Array (PCLA) illustrated above, may be implemented through the following process:
1. START
2. If previous operation is complete or if new data is needed, get new inputs. These inputs may come from continuous or discretely sampled data from sensors built into the array, or they can be scanned into the input nodes from an external data source, including, but not limited to the PCA, by employing an appropriate scanning mechanism.
3. Carry out the specified operation. The operation code that specifies the operation can be applied from either an external source or from internal stored program memory.
4. Allow sufficient time for the operation to complete, i.e., for the electronic circuits to reach a point where the change of the value of the output of the array equals zero. Output of active sensors should have been digitized a priori.
5. Read and store the output(s) of the array. The output can be stored externally or internally. If the PCLA is used in tandem with a PCA, then the output can also be sent to PCA.
6. Wait for next operation.
7. If end of program, go to (END).
8. Go to (2).
9. END Communication between the PCA and PCLA It is evident that in addition to power and ground signals, many other data, control and address signals common need to be distributed all across the chip. As is the case with many photosensor chips, the PCA portion of the chip should be covered with a layer of metal with openings only at the photosensitive areas to allow for the exposure to light of the package. Typically, one would ground that layer of metal that covers the whole chip. A similar layer could also be used on the PCLA portion of th e dual architecture to carry the output of the PCA to all points of the logic array.

The row select and column select signals of the PCA are reminiscent of memory addressing diagrams. Only when both signals are logic high's, a specific pixel is selected. These signals may be used to load the weights to the cell.

Elements of the PCLA can also be addressed as one would address memory cells. A row of cells could be thought of as a long word. A set of write and shift operations could replace the need to route multiple address signals across the PCLA.

PCA and PCLA Tandem Process

Figure 25:
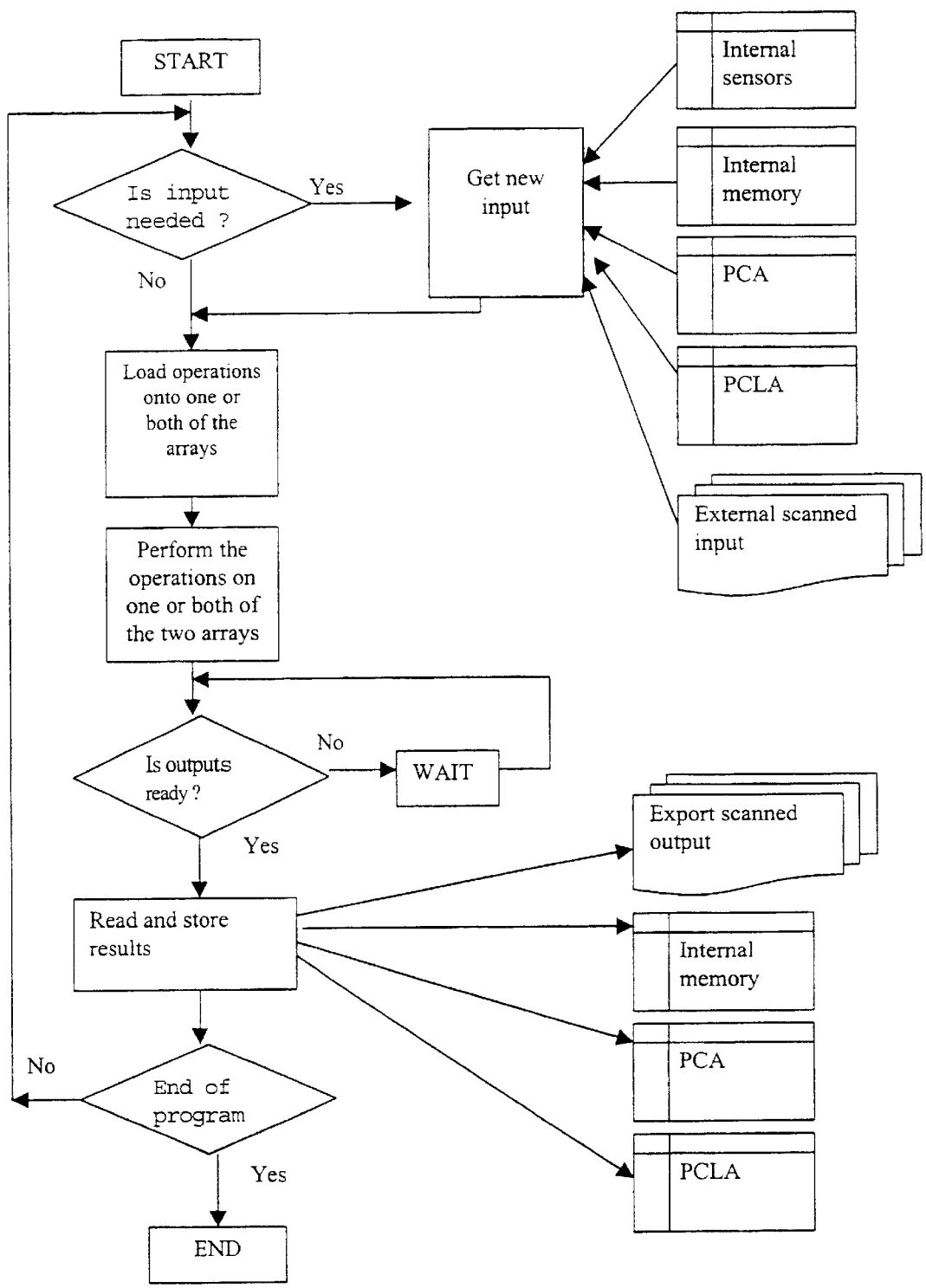
FIG. 25 illustrates an embodiment of an operational process in flow chart format for using the programmable convolution array (PCA) and programmable cellular logic array (PCLA) of the dual distributed architecture cooperatively in accordance with the teachings of one embodiment of the present invention.

FIG. 25 illustrates one embodiment of the operational process of using the Programmable Convolution Array (PCA) and the Programmable Cellular Logic Array (PCLA) in tandem. In one embodiment, before the process begins, the necessary weight patterns to be applied to the PCA for all of the operations to be performed is determined. Likewise, the necessary local and global logic functions that are needed for the PCLA is determined. In one embodiment, an operation is defined by the pattern of weights for the PCA and the pattern of logic functions carried out by the individual elements of the PCLA.

Accordingly, in one embodiment, a program is made of the sequence of operations needed to complete the task, such that each step of the program specifies one or more operations to be performed by either the PCA or the PCLA, or both. In one embodiment, the program may be stored externally or on the same chip or multichip module where the two arrays is implemented. In an alternate embodiment, the program memory may be central or local, i.e., each cell of the arrays can have its own program memory.

Referring back to FIG. 25, one embodiment of the operational process using the Programmable Convolution Array (PCA) and the Programmable Cellular Logic Array (PCLA) in tandem, may be implemented through the following process:
1. START
2. If previous operation is complete or if new data is needed, get new inputs. These inputs may come from continuous or discretely sampled data from sensors built into one or more of the arrays, or they can be scanned into the input nodes from an external data source, including, but not limited to from one array to the other, by employing an appropriate scanning mechanism.
3. Carry out the specified operation. The operation code that specifies the operation can be applied from either an external source or from internal stored program memory.
4. Allow sufficient time for the operation to complete, i.e., for the electronic circuits to reach a point where the change of the value of the output of the array equals zero or by some other criteria, the operation is deemed to be complete.

5. Read and store the output(s) of the array(s). The output can be stored externally or internally. The output can also be sent from one array to the other.
6. Wait for next operation.
7. If end of program, go to (END).
8. Go to(2).
9. END Application Example: Single chip finger print lock control An application of the concepts of the present invention may be applied to finger print recognition systems. Finger print systems currently require a sensor, memory, processor, and loads of software, which in turn limits their practical application. There would be a myriad of applications for a single chip, however, that can accomplish the same task with no external processor, memory, or program. For instance, a lock on a door or a drawer or power button that has a fingerprint key are examples. The latch remains in position until one of the "authorized" fingerprints are impressed on the lock.

In this example, since the image of the fingerprint is binary, it may be practical to equip the PCLA with binary sensors and use it on its own. The logic program to manipulate the image and decide whether this is the right fingerprint or not, could be built directly into the device. Alternately, if only a linear transformation of the fingerprint image suffices, one can build a stand alone PCA. The programs could be the combinations of the weights, which may be stored on the device. As another option, using both the PCLA and the PCA may enhance the features, increase the resolution, or offer more security.

Computer Environment

Figure 26:
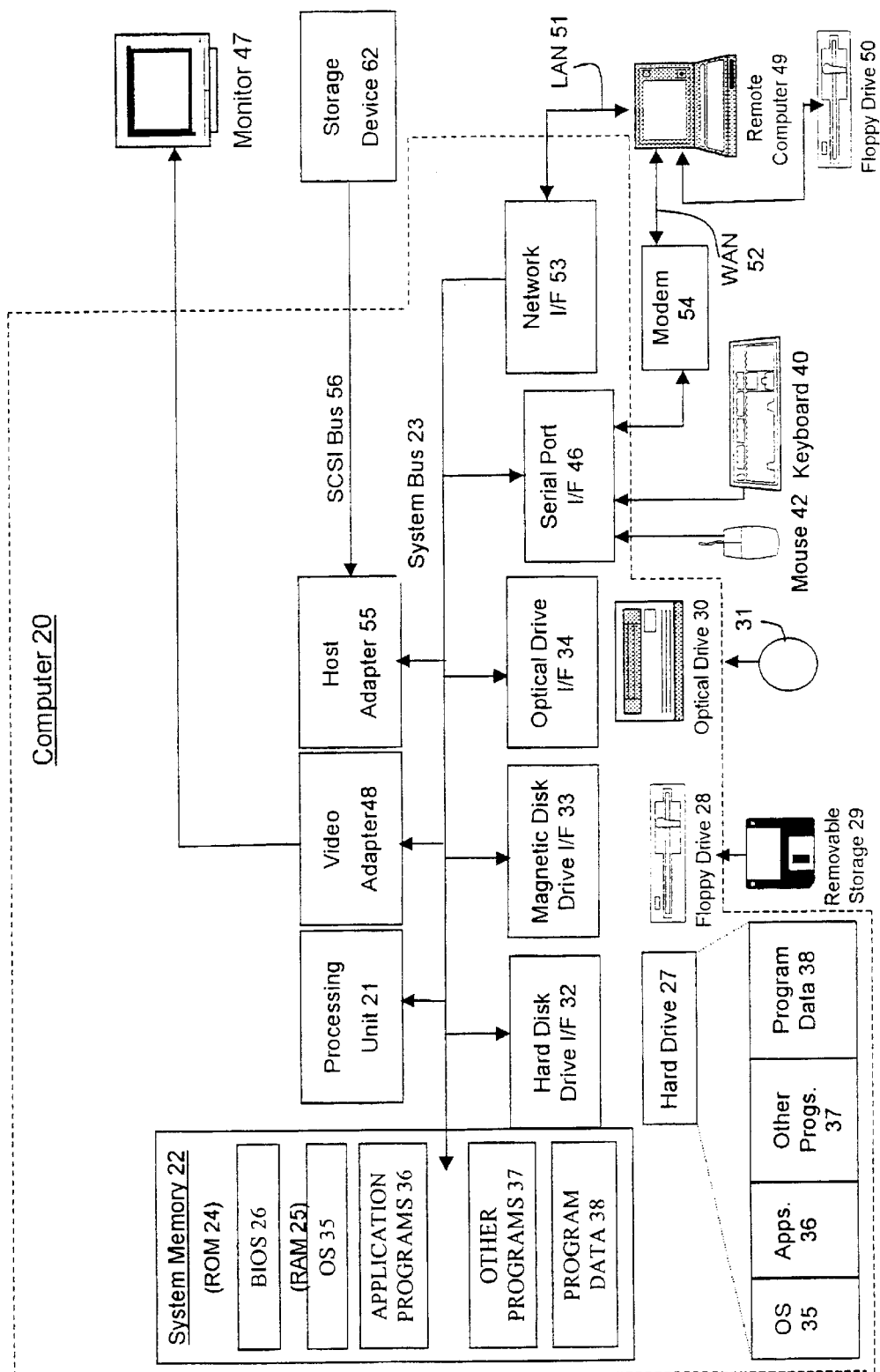
FIG. 26 illustrates an embodiment of a computing environment in which the invention may be implemented in accordance with the teachings of one embodiment of the present invention.

FIG. 26 and the above description are intended to provide a general description of a suitable computing environment in which the invention may be implemented. Although not necessarily required, one embodiment of the present invention may be implemented as a set of general context of computer-executable instructions, such as program modules, being executed by a computer, such as a client workstation or a server. Generally, program modules include routines, programs, objects, components, data structures and the like that perform particular tasks or implement particular abstract data types.

Moreover, those skilled in the art will appreciate that the invention may be practiced with other computer system configurations, including hand-held devices, multi-processor systems, microprocessor-based or programmable consumer electronics, communication devices, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 26, an exemplary general purpose computing system may include a conventional personal computer 20 or the like, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory 22 may include read-only memory (ROM) 24 and random access memory (RAM) 25. A basic input/output system 26 (BIOS), containing the basic routines that help to transfer information between elements within the personal computer 20, such as during start-up, may be stored in ROM 24. The personal computer, 20 may further include a hard disk drive, 27 for reading from and writing to a hard disk (not shown), a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 may be connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20.

Although the exemplary embodiment described herein may employ a hard disk, a removable magnetic disk 29, and a removable optical disk 31, or combination thereof, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer through input devices such as a keyboard 40 and pointing device 42. Other input devices (not shown) may include a microphone or microphones, joystick, game pad, satellite disk, scanner, or the like. These and other input devices are often connected to the processing unit 21 through a serial port interface 46 that is coupled to the system bus 23, but may be connected by other interfaces, such as a parallel port, game port, or universal serial bus (USB). A monitor 47 or other type of display device may also be connected to the system bus 23 via an interface, such as a video adapter 48. In addition to the monitor 47, personal computers may typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 26. The logical connections depicted in FIG. 26 include a local area network (LAN) 51 and a wide area network (WAN) 52. Such networking environments are commonplace in offices, enterprise-wide computer networks, Intranets, and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

It is further understood that different elements or components may be included or excluded from the general computing environment, or otherwise combined, to implement the concepts and teachings of the present invention as defined in the appended claims.

Network Environment

Figure 27:
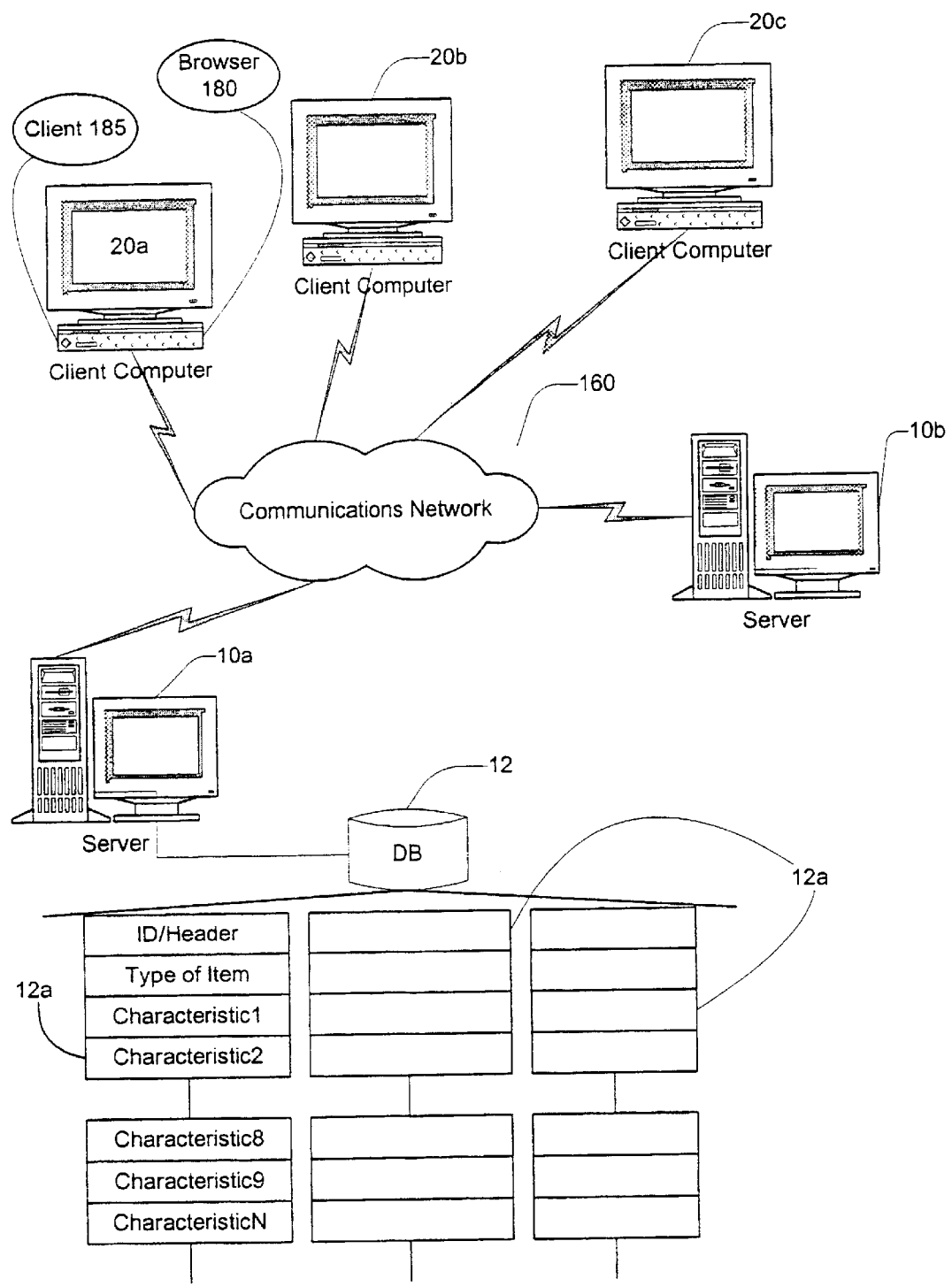
FIG. 27 illustrates an embodiment of a network environment in which the invention may be implemented in accordance with the teachings of one embodiment of the present invention.

As noted, the general-purpose computer described above can be deployed as part of a computer network. In general, the above description applies to both server computers and client computers deployed in a network environment. FIG. 27 illustrates one such exemplary network environment in which the present invention may be employed. As shown in FIG. 27, a number of servers 10a, 10b, etc., are interconnected via a communications network 160 (which may be a LAN, WAN, Intranet or the Internet) with a number of client computers 20a, 20b, 20c, etc. In a network environment in which the communications network 160 is, e.g., the Internet, the servers 10 can be Web servers with which the clients 20 communicate via any of a number of known protocols such as, for instance, hypertext transfer protocol (HTTP). Each client computer 20 can be equipped with a browser 180 to gain access to the servers 10, and client application software 185. As shown in the embodiment of FIG. 27, server 10a includes or is coupled to a dynamic database 12.

As shown, the database 12 may include database fields 12a, which contain information about items stored in the database 12. For instance, the database fields 12a can be structured in the database in a variety of ways. The fields 12a could be structured using linked lists, multi-dimensional data arrays, hash tables, or the like. This is generally a design choice based on ease of implementation, amount of free memory, the characteristics of the data to be stored, whether the database is likely to be written to frequently or instead is likely to be mostly read from, and the like. A generic field 12a is depicted on the left side. As shown, a field generally has sub-fields that contain various types of information associated with the fields such as an ID or header sub-field, type of item sub-field, sub-fields containing characteristics, and so on. These database fields 12a are shown for illustrative purposes only, and as mentioned, the particular implementation of data storage in a database can vary widely according to preference.

Thus, the present invention can be utilized in a computer network environment having client computers for accessing and interacting with the network and a server computer for interacting with client computers and communicating with a database with stored inventory fields. Likewise, the present invention can be implemented with a variety of network-based architectures, and thus should not be limited to the examples shown.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. An integrated sensing device including an array of sensor processor cells capable of being arranged into a detection array, each sensor processor cell comprising:
   a sensing medium;
   at least one feedforward transconductance amplifier configured for feedforward template multiplication, each feedforward transconductance amplifier having an output connected to a common node, at least one feedforward transconductance amplifier in communication with the sensing medium;
   at least one feedback transconductance amplifier configured for feedback template weights, each feedback transconductance amplifier having an output connected to the common node;
   a plurality of local dynamic memory cells;
   a data bus for data transfer; and
   a local logic unit;
   whereby the array of sensor processor cells, by responding to data control signals, is capable of transforming, reshaping, and modulating an original sensed image into varied representations.

2. An integrated sensor processing cell device comprising:
   a sensing medium configured to produce a signed pixel output;
   at least one memory device configured for storage of weight bits, wherein at least one of the at least one memory device is configured to store the signed pixel output;
   a plurality of multiplexers operatively associated with at least one of the memory device;
   at least one transconductance amplifier operatively associated with at least one of the plurality of multiplexers, that at least one transconductance amplifier configured for operation in a unity follower configuration with variable gain; and
   a multiple input logic gate associated with the at least one of said memory devices that is configured to store the signed pixel output;
   whereby the integrated sensor processing cell, by responding to data control signals, is capable of transforming, reshaping, and modulating an original sensed image into varied representations.

3. An integrated sensing and imaging device comprising:
   an array of sensor processor cells capable of being arranged into a detection array, each said sensor processor cell comprising:
     a sensing medium configured to produce an electrically representable signal output,
     a means of quantifying the said sensor output,
     a means of storing said sensor output; and
     a plurality of programmable logic elements arranged on a cellular grid, wherein each logic element is capable of receiving inputs from the output of neighboring sensor processor cells and outputs fed back from itself;
   whereby the integrated imaging device, by responding to internal or external data control signals, is capable of transforming, reshaping, and modulating original sensed signals into varied representations.

* * * * *

UNITED STATES PATENT AND TRADEMARK OFFICE
CERTIFICATE OF CORRECTION

PATENT NO. : 6,735,482 B1 Page 1 of 1
DATED : May 11, 2004
INVENTOR(S) : Gamze Erten et al.

It is certified that error appears in the above-identified patent and that said Letters Patent is hereby corrected as shown below:

Column 22,
Line 53, delete "the".

Signed and Sealed this

Twenty-seventh Day of July, 2004

JON W. DUDAS
*Acting Director of the United States Patent and Trademark Office*